(12) United States Patent
Grivna et al.

(10) Patent No.: US 9,377,905 B1
(45) Date of Patent: Jun. 28, 2016

(54) MULTIPLEXER FOR A TX/RX CAPACITANCE SENSING PANEL

(75) Inventors: Edward Grivna, Brooklyn Park, MN (US); Timothy Williams, Bellevue, WA (US); Hans Klein, Pleasanton, CA (US)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 1100 days.

(21) Appl. No.: 13/360,296

(22) Filed: Jan. 27, 2012

Related U.S. Application Data

(60) Provisional application No. 61/491,809, filed on May 31, 2011.

(51) Int. Cl.
*G06F 3/044* (2006.01)
*G06F 3/041* (2006.01)

(52) U.S. Cl.
CPC .............. *G06F 3/044* (2013.01); *G06F 3/0416* (2013.01); *G06F 2203/04111* (2013.01)

(58) Field of Classification Search
CPC ................................ G06F 3/044; G06F 3/0416
USPC ................................................. 345/173–174
See application file for complete search history.

(56) References Cited

U.S. PATENT DOCUMENTS

| 5,841,078 | A | * | 11/1998 | Miller et al. | 178/18.06 |
| 2007/0229468 | A1 | * | 10/2007 | Peng et al. | 345/173 |
| 2008/0007534 | A1 | * | 1/2008 | Peng et al. | 345/173 |
| 2008/0277171 | A1 | * | 11/2008 | Wright | 178/18.06 |
| 2011/0025629 | A1 | * | 2/2011 | Grivna et al. | 345/173 |

OTHER PUBLICATIONS

SIPPO Office Action for International Application No. 201080042141.X dated Apr. 23, 2014; 6 pages.

* cited by examiner

*Primary Examiner* — Kumar Patel
*Assistant Examiner* — Amy C Onyekaba
(74) *Attorney, Agent, or Firm* — Morgan, Lewis & Bockius LLP

(57) ABSTRACT

An embodiment of a multiplexer circuit may include a plurality of $P_{TOTAL}$ receive (RX) channel outputs and a plurality of $Q_{TOTAL}$ pins, where $Q_{TOTAL}$ is greater than $P_{TOTAL}$. Each of a first subset and a third subset of the plurality of $Q_{TOTAL}$ pins may be switchably coupled to at least one of the plurality of RX channels, each of a second subset of the plurality of $Q_{TOTAL}$ pins is switchably coupled to two of the plurality of RX channels, and for each possible subset of $P_{TOTAL}$ contiguous pins from the plurality of $Q_{TOTAL}$ pins, each pin in the possible subset may be switchably coupled to a different RX channel output of the plurality of RX channel outputs.

20 Claims, 33 Drawing Sheets

MULTIPLEXER FOR A TX/RX CAPACITANCE SENSING PANEL

RELATED APPLICATIONS

This application claims priority to U.S. Provisional Application No. 61/491,809, filed on May 31, 2011, which is hereby incorporated by reference.

TECHNICAL FIELD

This disclosure relates to the field of touch-sensors and, in particular, to a multiplexor for connecting a capacitance measuring device to a capacitive sensor array.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch sensor pad replicates X/Y movement using a collection of capacitive sensor elements, arranged along two defined axes, which detect the presence or proximity of one or more conductive objects, such as a finger. Mouse right/left button clicks can be replicated by two mechanical or capacitive-sensed buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include multi-dimensional sensor arrays for determining movement of the conductive object in multiple axes. The sensor array may include a one-dimensional sensor array, detecting movement in one axis. The sensor array may also be two dimensional, detecting movements in two axes.

Another user interface device that has become more common is a touch screen. Touch screens, also known as touchscreens, touch windows, touch panels, or touchscreen panels, are transparent display overlays which are typically either pressure-sensitive (resistive or piezoelectric), electrically-sensitive (capacitive), acoustically-sensitive (surface acoustic wave (SAW)) or photo-sensitive (infra-red). Such overlays allow a display to be used as an input device, removing the keyboard and/or the mouse as the primary input device for interacting with the displayed image's content. Such displays can be attached to computers or, as terminals, to networks. Touch screens have become familiar in retail settings, on point-of-sale systems, on ATMs, on mobile handsets, on kiosks, on game consoles, and on PDAs where a stylus is sometimes used to manipulate the graphical user interface (GUI) and to enter data. A user can touch a touch screen or a touch-sensor pad to manipulate data. For example, a user can apply a single touch, by using a finger to touch the surface of a touch screen, to select an item from a menu.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention.

In one embodiment, a capacitive sensor array having multiple sensor elements may be connected to a multi-channel capacitance measuring device having fewer channels than the number of sensor elements in the sensor array. In one embodiment, the multiplexer may be used to measure the self-capacitance for each of the sensor elements in the sensor array, or may be used to measure a mutual capacitance between pairs of sensor elements. In one embodiment, a multiplexer circuit used to connect such a multi-channel capacitance measuring device to the sensor array may include a number of receive (RX) channel outputs. For example, a multiplexer having $N_{TOTAL}$ receive channel outputs may be used to connect the RX channels of a capacitance measuring device with sensor elements of a capacitive sensor array through a number of $M_{TOTAL}$ pins, where $M_{TOTAL}$ is greater than $N_{TOTAL}$.

In one embodiment, each of the $M_{TOTAL}$ pins of the multiplexer may be coupled via switch to at least one of the RX channel outputs, with a subset of the $M_{TOTAL}$ pins being connected via additional switches to two or more of the RX channel outputs. For example, each pin of a first subset and a third subset of the $M_{TOTAL}$ pins may be switchably connected (connected via one or more switches) to one of the RX channel outputs, while each of a second subset of pins may be switchably connected to two of the RX channel outputs.

In one embodiment, the multi-channel capacitance sensing device may be configured to perform successive window scans of the capacitive sensor array, where each window scan includes a capacitance measurement for a subset of the sensor elements. In one embodiment, the successive scanned windows may move to follow a tracked object, such as a finger. Thus, in one embodiment, for each possible subset of $N_{TOTAL}$ contiguous pins, each pin is connected via switch to a different RX channel output, so that the capacitance measurements for a window scan of up to $N_{TOTAL}$ sensor elements may each be performed using a different RX channel. Thus, the capacitance measurements may be performed within a single scan pass, since the measurements may be performed in parallel.

Figure 1:
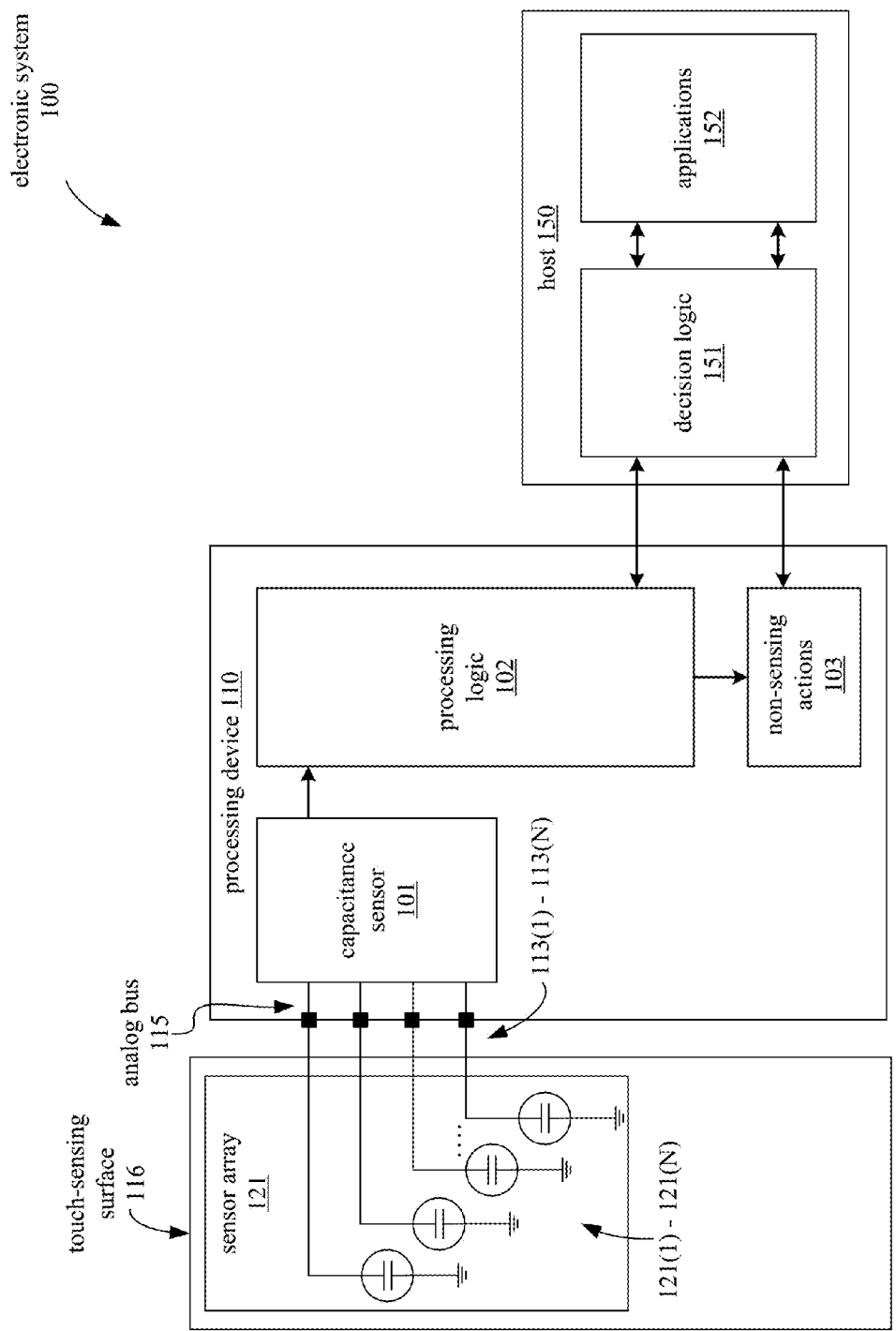
FIG. 1 is a block diagram illustrating an embodiment of an electronic system that processes touch sensor data.

FIG. 1 illustrates a block diagram of one embodiment of an electronic system 100 including a processing device 110 that may be configured to measure capacitances from a touch sensing surface 116 including a capacitive sensor array. In one embodiment, a multiplexer circuit such as the multiplexer circuit described above may be used to connect a capacitive sensor 101 with a sensor array 121. The electronic system 100 includes a touch-sensing surface 116 (e.g., a touchscreen, or a touch pad) coupled to the processing device 110 and a host 150. In one embodiment, the touch-sensing surface 116 is a two-dimensional user interface that uses a sensor array 121 to detect touches on the surface 116.

In one embodiment, the sensor array 121 includes sensor elements 121(1)-121(N) (where N is a positive integer) that are disposed as a two-dimensional matrix (also referred to as an XY matrix). The sensor array 121 is coupled to pins 113(1)-113(N) of the processing device 110 via one or more analog buses 115 transporting multiple signals. In this embodiment, each sensor element 121(1)-121(N) is represented as a capacitor.

In one embodiment, the capacitance sensor 101 may include a relaxation oscillator or other means to convert a capacitance into a measured value. The capacitance sensor 101 may also include a counter or timer to measure the oscillator output. The processing device 110 may further include software components to convert the count value (e.g., capacitance value) into a sensor element detection decision (also referred to as switch detection decision) or relative magnitude. It should be noted that there are various known methods for measuring capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms. It should be noted however, instead of evaluating the raw counts relative to a threshold, the capacitance sensor 101 may be evaluating other measurements to determine the user interaction. For example, in the capacitance sensor 101 having a sigma-delta modulator, the capacitance sensor 101 is evaluating the ratio of pulse widths of the output, instead of the raw counts being over or under a certain threshold.

In one embodiment, the processing device 110 further includes processing logic 102. Operations of the processing logic 102 may be implemented in firmware; alternatively, it may be implemented in hardware or software. The processing logic 102 may receive signals from the capacitance sensor 101, and determine the state of the sensor array 121, such as whether a conductive object (e.g., a finger) is detected on or in proximity to the sensor array 121 (e.g., determining the presence of the object), where the object is detected on the sensor array (e.g., determining the location of the object), tracking the motion of the object, or other information related to an object detected at the touch sensor.

In another embodiment, instead of performing the operations of the processing logic 102 in the processing device 110, the processing device 110 may send the raw data or partially-processed data to the host 150. The host 150, as illustrated in FIG. 1, may include decision logic 151 that performs some or all of the operations of the processing logic 102. Operations of the decision logic 151 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, or scaling operations. The operations described with respect to the processing logic 102 may be implemented in the decision logic 151, the applications 152, or in other hardware, software, and/or firmware external to the processing device 110. In some other embodiments, the processing device 110 is the host 150.

In another embodiment, the processing device 110 may also include a non-sensing actions block 103. This block 103 may be used to process and/or receive/transmit data to and from the host 150. For example, additional components may be implemented to operate with the processing device 110 along with the sensor array 121 (e.g., keyboard, keypad, mouse, trackball, LEDs, displays, or other peripheral devices).

The processing device 110 may reside on a common carrier substrate such as, for example, an integrated circuit (IC) die substrate, or a multi-chip module substrate. Alternatively, the components of the processing device 110 may be one or more separate integrated circuits and/or discrete components. In one embodiment, the processing device 110 may be the Programmable System on a Chip (PSoC™) processing device, developed by Cypress Semiconductor Corporation, San Jose, Calif. Alternatively, the processing device 110 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or other programmable device. In an alternative embodiment, for example, the processing device 110 may be a network processor having multiple processors including a core unit and multiple micro-engines. Additionally, the processing device 110 may include any combination of general-purpose processing device(s) and special-purpose processing device(s).

In one embodiment, the electronic system 100 is implemented in a device that includes the touch-sensing surface 116 as the user interface, such as handheld electronics, portable telephones, cellular telephones, notebook computers, personal computers, personal data assistants (PDAs), kiosks, keyboards, televisions, remote controls, monitors, handheld multi-media devices, handheld video players, gaming devices, control panels of a household or industrial appliances, or other computer peripheral or input devices. Alternatively, the electronic system 100 may be used in other types of devices. It should be noted that the components of electronic system 100 may include all the components described above. Alternatively, electronic system 100 may include only some of the components described above, or include additional components not listed herein.

Figure 2:
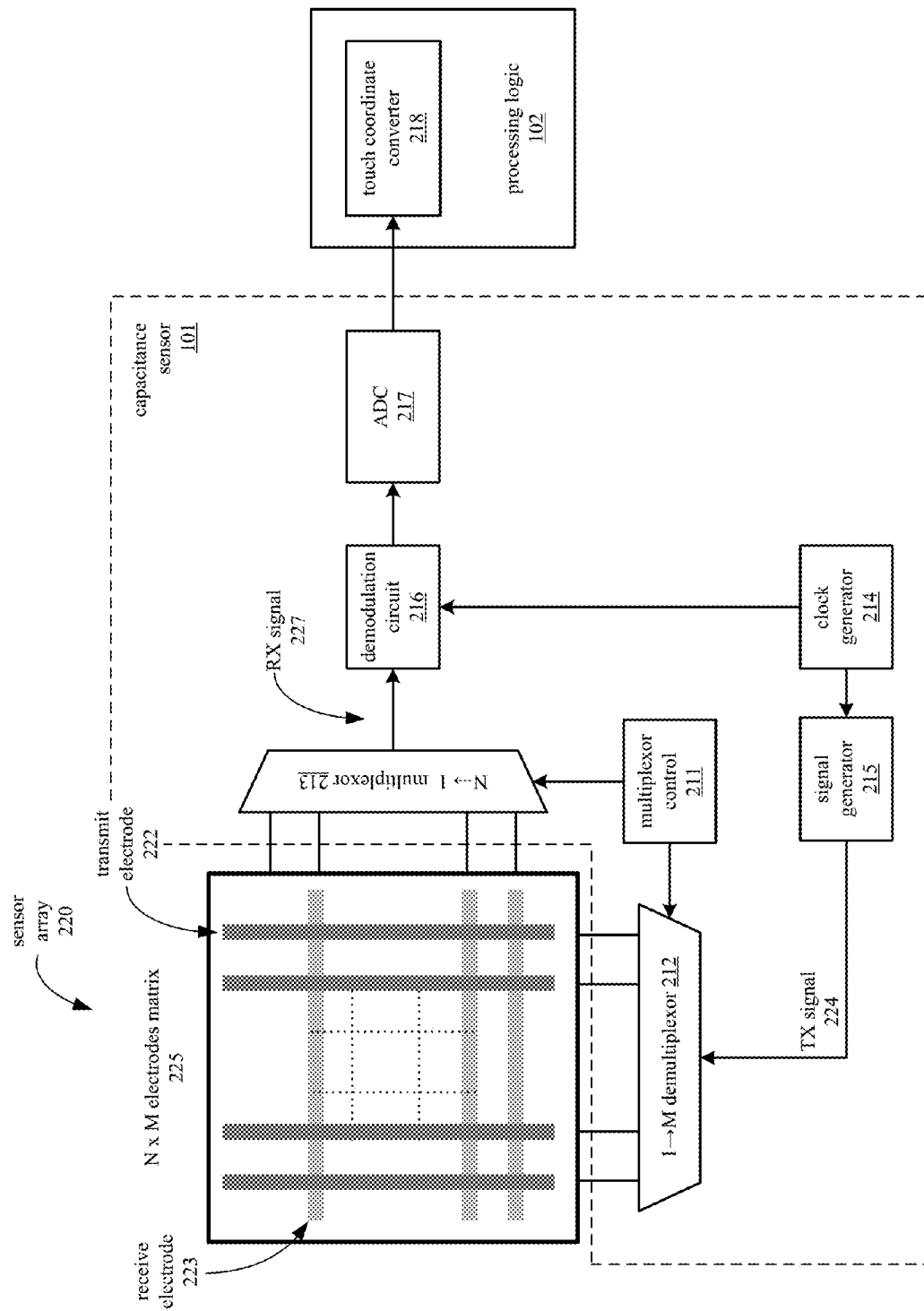
FIG. 2 is a block diagram illustrating an embodiment of an electronic system that processes touch sensor data.

FIG. 2 is a block diagram illustrating one embodiment of a capacitive touch sensor array 220 and a capacitance sensor 101 used to convert changes in measured capacitances to coordinates indicating the presence and location of touch. The coordinates may be calculated in a touch coordinate converter 218 based on changes in measured capacitances relative to the capacitances of the same touch sensor array 220 in an un-touched state. In one embodiment, sensor array 220 and capacitance sensor 101 are implemented in a system such as electronic system 100. Sensor array 220 includes a matrix 225 of N×M electrodes (N receive electrodes and M transmit electrodes), which further includes transmit (TX) electrode 222 and receive (RX) electrode 223. Each of the electrodes in matrix 225 is connected with capacitance sensing circuit 101 through demultiplexer 212 and multiplexer 213.

Capacitance sensor 101 includes multiplexer control 211, demultiplexer 212 and multiplexer 213, clock generator 214, signal generator 215, demodulation circuit 216, and analog to digital converter (ADC) 217. ADC 217 is further coupled with touch coordinate converter 218. Touch coordinate converter 218 may be implemented in the processing logic 102.

The transmit and receive electrodes in the electrode matrix 225 may be arranged so that each of the transmit electrodes overlap and cross each of the receive electrodes such as to form an array of intersections, while maintaining galvanic isolation from each other. Thus, each transmit electrode may be capacitively coupled with each of the receive electrodes. For example, transmit electrode 222 is capacitively coupled with receive electrode 223 at the point where transmit electrode 222 and receive electrode 223 overlap.

Clock generator 214 supplies a clock signal to signal generator 215, which produces a TX signal 224 to be supplied to the transmit electrodes of touch sensor 121. In one embodiment, the signal generator 215 includes a set of switches that operate according to the clock signal from clock generator 214. The switches may generate a TX signal 224 by periodically connecting the output of signal generator 215 to a first voltage and then to a second voltage, wherein said first and second voltages are different.

The output of signal generator 215 is connected with demultiplexer 212, which allows the TX signal 224 to be applied to any of the M transmit electrodes of touch sensor 121. In one embodiment, multiplexer control 211 controls demultiplexer 212 so that the TX signal 224 is applied to each transmit electrode 222 in a controlled sequence. Demultiplexer 212 may also be used to ground, float, or connect an alternate signal to the other transmit electrodes to which the TX signal 224 is not currently being applied. In an alternate embodiment the TX signal 224 may be presented in a true form to a subset of the transmit electrodes 222 and in complement form to a second subset of the transmit electrodes 222, wherein there is no overlap in members of the first and second subset of transmit electrodes 222.

Because of the capacitive coupling between the transmit and receive electrodes, the TX signal 224 applied to each transmit electrode induces a current within each of the receive electrodes. For instance, when the TX signal 224 is applied to transmit electrode 222 through demultiplexer 212, the TX signal 224 induces an RX signal 227 on the receive electrodes in matrix 225. The RX signal 227 on each of the receive electrodes can then be measured in sequence by using multiplexer 213 to connect each of the N receive electrodes to demodulation circuit 216 in sequence.

The mutual capacitance associated with each intersection between a TX electrode and an RX electrode can be sensed by selecting every available combination of TX electrode and an RX electrode using demultiplexer 212 and multiplexer 213. To improve performance, multiplexer 213 may also be segmented to allow more than one of the receive electrodes in matrix 225 to be routed to additional demodulation circuits 216. In an optimized configuration, wherein there is a 1-to-1 correspondence of instances of demodulation circuit 216 with receive electrodes, multiplexer 213 may not be present in the system.

When a conductive object, such as a finger, approaches the electrode matrix 225, the object causes a decrease in the measured mutual capacitance between only some of the electrodes. For example, if a finger is placed near the intersection of transmit electrode 222 and receive electrode 223, the presence of the finger will decrease the charge coupled between electrodes 222 and 223. Thus, the location of the finger on the touchpad can be determined by identifying the one or more receive electrodes having a decrease in measured mutual capacitance in addition to identifying the transmit electrode to which the TX signal 224 was applied at the time the decrease in capacitance was measured on the one or more receive electrodes.

By determining the mutual capacitances associated with each intersection of electrodes in the matrix 225, the presence and locations of one or more conductive objects may be determined. The determination may be sequential, in parallel, or may occur more frequently at commonly used electrodes or intersections.

In alternative embodiments, other methods for detecting the presence of a finger or other conductive object may be used where the finger or conductive object causes an increase in measured capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined based on the locations of one or more electrodes at which a change in measured capacitance is detected.

The induced current signal 227 is integrated by demodulation circuit 216. The rectified current output by demodulation circuit 216 can then be filtered and converted to a digital code by ADC 217.

A series of such digital codes measured from adjacent sensors or intersections may be converted to touch coordinates indicating a position of an input on touch sensor array 121 by touch coordinate converter 218. The touch coordinates may then be used to detect gestures or perform other functions by the processing logic 102.

In one embodiment, the capacitance sensor 101 can be configured to detect multiple touches. One technique for the detection and location resolution of multiple touches uses a two-axis implementation: one axis to support rows and another axis to support columns. Additional axes, such as a diagonal axis, implemented on the surface or using additional layers, can allow resolution of additional touches.

Figure 3:
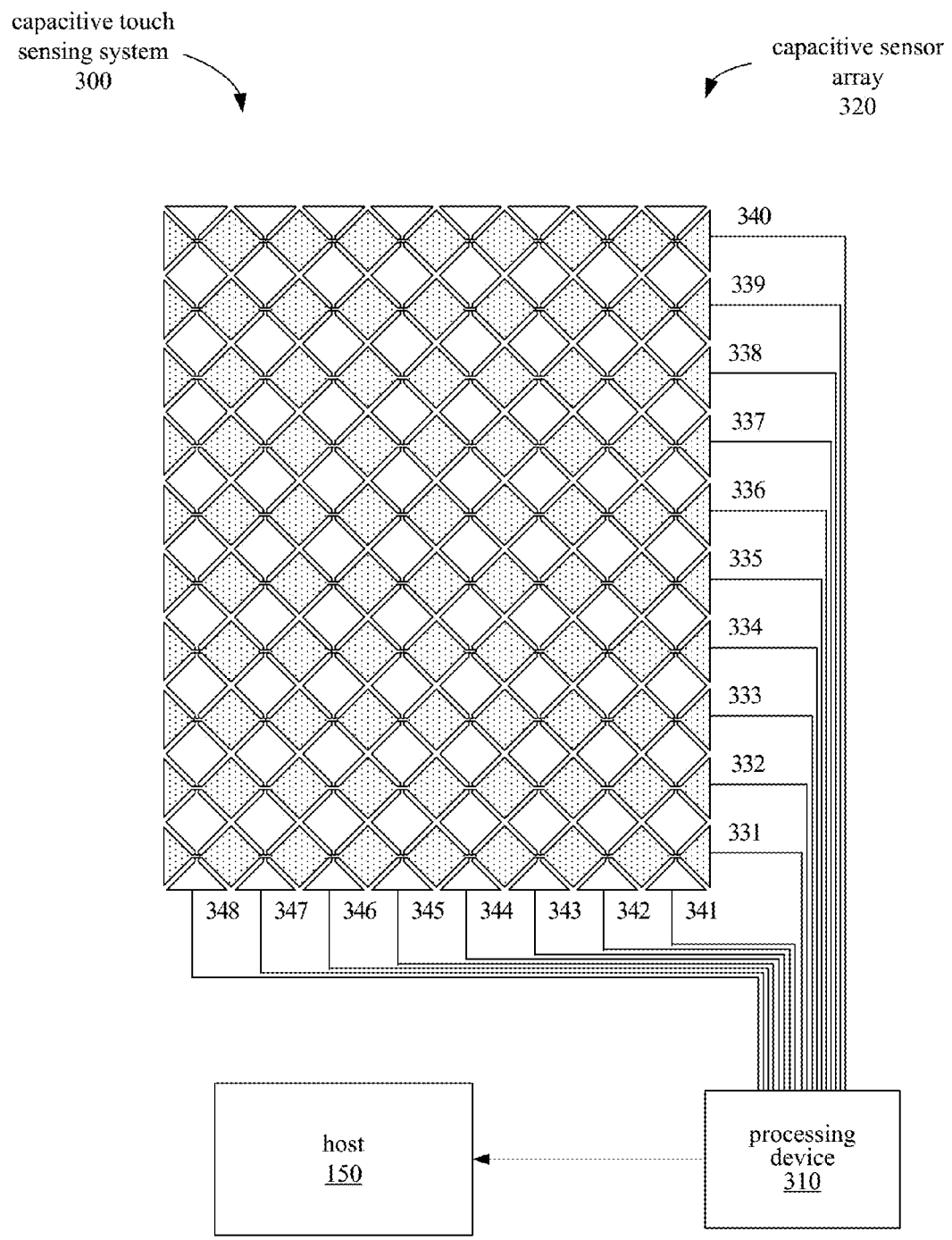
FIG. 3 illustrates an embodiment of a capacitive sensor array having a diamond pattern.

FIG. 3 illustrates an embodiment of a capacitive touch sensing system 300 that includes a capacitive sensor array 320. Capacitive sensor array 320 includes a plurality of row sensor elements 331-340 and a plurality of column sensor elements 341-348. The row and column sensor elements 331-348 are connected to a processing device 310, which may include the functionality of capacitance sensor 101, as illustrated in FIG. 2. In one embodiment, the processing device 310 may perform mutual capacitance scans of the capacitive sensor array 320 to measure a mutual capacitance value associated with each of the intersections between a row sensor element and a column sensor element in the sensor array 320. The measured capacitances may be further processed to determine centroid locations of one or more conductive objects proximate to the capacitive sensor array 320.

In one embodiment, the processing device 310 is connected to a host 150 which may receive the measured capacitances or calculated centroid locations from the processing device 310.

Figure 4:
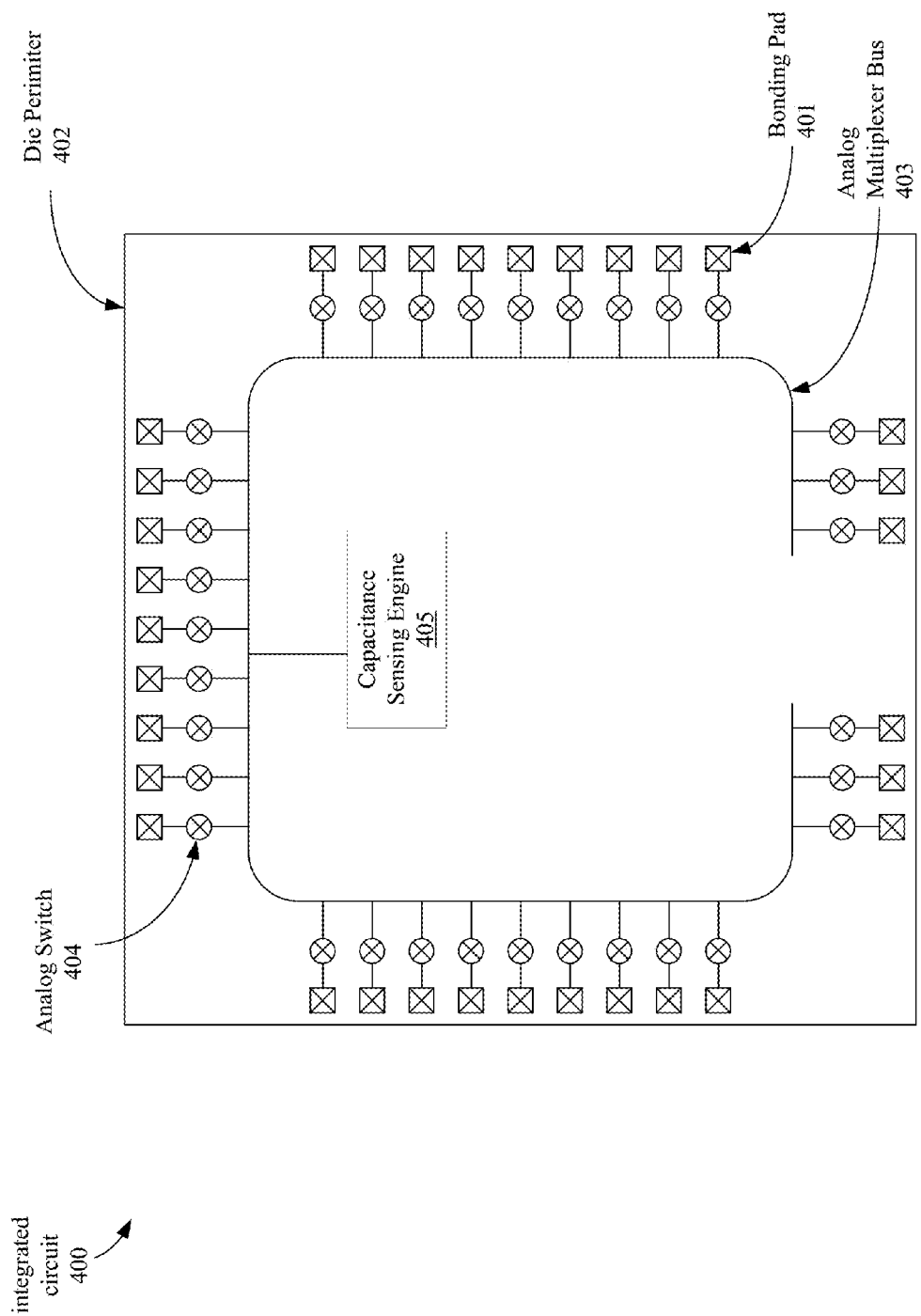
FIG. 4 illustrates a bus configuration for a touchscreen controller, according to an embodiment.

FIG. 4 illustrates an integrated circuit 400 having bonding pads, such as pad 401, along the perimeter 402 of the die. The perimeter bonding pads may be connected to wirebonds for connecting the die to a package, or to a redistribution layer (RDL) that may be added to make a chip-scale package. In one embodiment, the integrated circuit 400 may be configured to measure self-capacitances of external electrodes, and to determine a presence of a conductive object at or near a touch-sensing surface based on the self-capacitance measurements. Devices such as integrated circuit 400 may make use of an analog multiplexer bus 403 to allow connection of the one or more external sense electrodes, through the device package pins, to sense circuits of the capacitance sensing engine 405.

Within the integrated circuit 400, as illustrated in FIG. 1, some subset of the bonding pads may be allowed to connect to the analog multiplexer bus 403 through a series of analog switches, such as analog switch 404. The analog switches may be controlled by state machines, or by a central processing unit (CPU) contained within the integrated circuit device 400. In one embodiment, the analog switches may be implemented as transmission gates or a similar construct. The analog switches may not be mutually exclusive, such that one or more of the switches may be closed at any time, or none of the switches may be closed. In one embodiment, a closed analog switch, such as switch 404, may allow bidirectional flow of current, charge, and voltage between the external package pins and any circuits connected to the multiplexer bus 403 within the integrated circuit device 400.

As illustrated in FIG. 4, the multiplexer bus 403 may be implemented near the bonding pads and input/output (I/O) structures of the die. In one embodiment, the multiplexer bus 403 may be implemented as an open-ended structure, as illustrated; alternatively, the bus 403 may form a complete circuit or loop around the entire integrated circuit device 400. In one embodiment where the multiplexer bus 403 carries low-level analog signals, the bus 403 may be shielded within the die by ground or virtual ground traces around the multiplexer bus 403.

Figure 5:
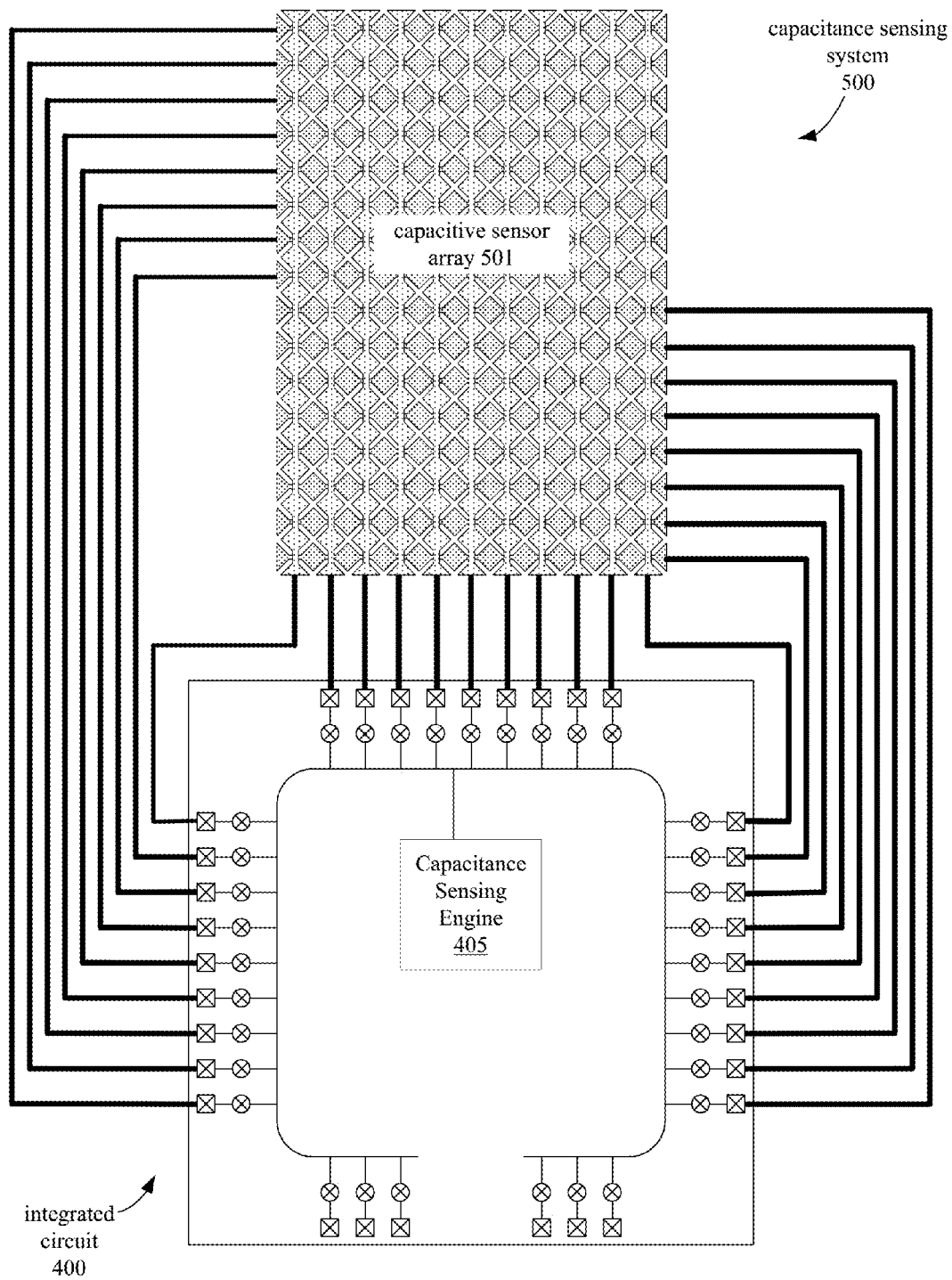
FIG. 5 illustrates an embodiment of a touchscreen controller configured to measure self-capacitances from a capacitance sensor array.

FIG. 5 illustrates a capacitance sensing system 500 that includes an integrated circuit device 400 that is connected to measure self capacitances from an XY matrix of sensor electrodes, or sensor elements, in a capacitive sensor array 501. In one embodiment, a self capacitance measurement is performed for each sensor electrode before the capacitance measurement integrated circuit device 400 moves on to a next step. In one embodiment, an array 501 having Y row and X column electrodes performs X+Y sensing operations to measure all the electrodes, regardless of the order in which the electrodes are measured.

The integrated circuit device 400, capacitive sensor array 501, and the traces connecting the device 400 and the sensor array 501 may be placed according to any of several different arrangements to minimize the cost and mechanical complexity of assembly. In one embodiment, this may be facilitated by an analog multiplexer bus 403 having a fully populated matrix of switches, wherein all available sensing pins may be connected to all available sensing engines. Relative to the embodiment in FIG. 5, since there is only a single sensing engine, only a single switch is required at each pin to fully populate the switch matrix.

In one embodiment, a portable or hand-held electronic device may have a touchscreen and sensor array that is centered around a long axis of the device. Such an arrangement may implement split routing to connect the pins of the capacitance sensing integrated circuit device 400 with the sensor array 501, where approximately half of the row sensor electrodes are connected and routed along the left edge of the touchscreen, and the remaining row sensor electrodes are routed along the opposite edge of the touchscreen, as illustrated in FIG. 5. This layout may be implemented without trace crossovers, and may be routed on a single layer.

Figure 6:
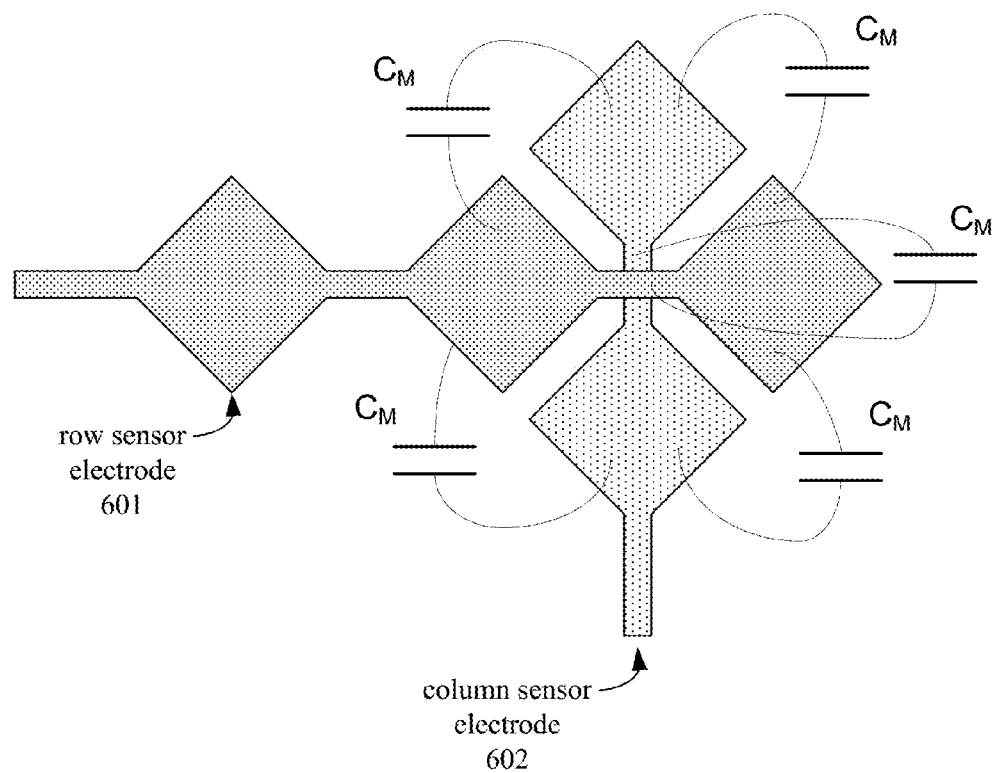
FIG. 6 illustrates mutual capacitances formed where a row electrode and column electrode cross, according to an embodiment.

FIG. 6 illustrates an intersection between a row sensor electrode 601 and a column sensor electrode 602, along with mutual capacitances CM between the electrodes, according to an embodiment. In one embodiment, a single sense channel may be sufficient to perform self-capacitance measurements of a sensor array having X+Y total sensor electrodes; however, for mutual capacitance measurements, a capacitive sensor array having X columns and Y rows may include X×Y intersections for which a mutual capacitance may be measured. In order to complete a mutual capacitance scan of the entire sensor array within the same time as a self-capacitance scan, each mutual capacitance measurement may either occur in a shorter amount of time, or occur in parallel with other mutual capacitance measurements.

Figure 7:
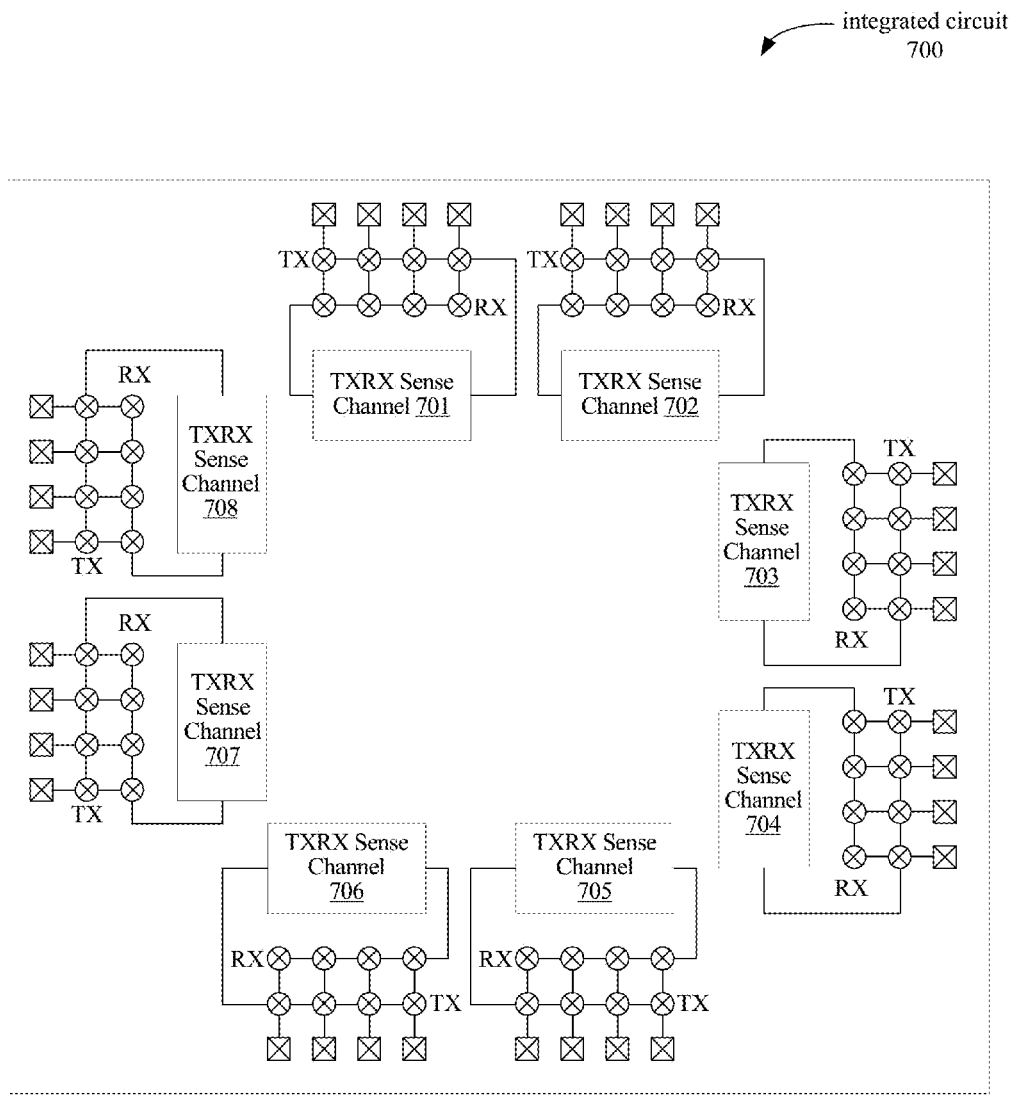
FIG. 7 illustrates a configuration for a touchscreen controller, according to an embodiment.

FIG. 7 illustrates an embodiment of a capacitance measurement integrated circuit chip 700 which is configured to perform parallel capacitance measurement of sensor electrodes. Integrated circuit chip 700 includes eight sensing channels 701-708, each connected to a dual 4:1 multiplexer. These multiplexers allow each sensing channel 701-708 to connect to a respective set of four adjacent pins of the device 700, and measure capacitance through the pins individually or in groups. In one embodiment, the sensing channels 701-708 may be capable of performing both self-capacitance and mutual capacitance measurements. For mutual capacitance measurements, the sense channels 701-708 may also include a transmit (TX) signal generator which is used to push and pull charge through the mutual capacitance formed where a row and column sensor electrode cross each other, such as the intersection illustrated in FIG. 6.

In one embodiment, each pad of the integrated circuit device 700 may connect to two analog buses, with the first analog bus supporting the TX function and the second analog bus supporting the connection between the sense channel and the sensor electrode. In one embodiment, these analog buses may be dedicated to a particular sense channel and may provide localized connections within a short distance.

Figure 8:
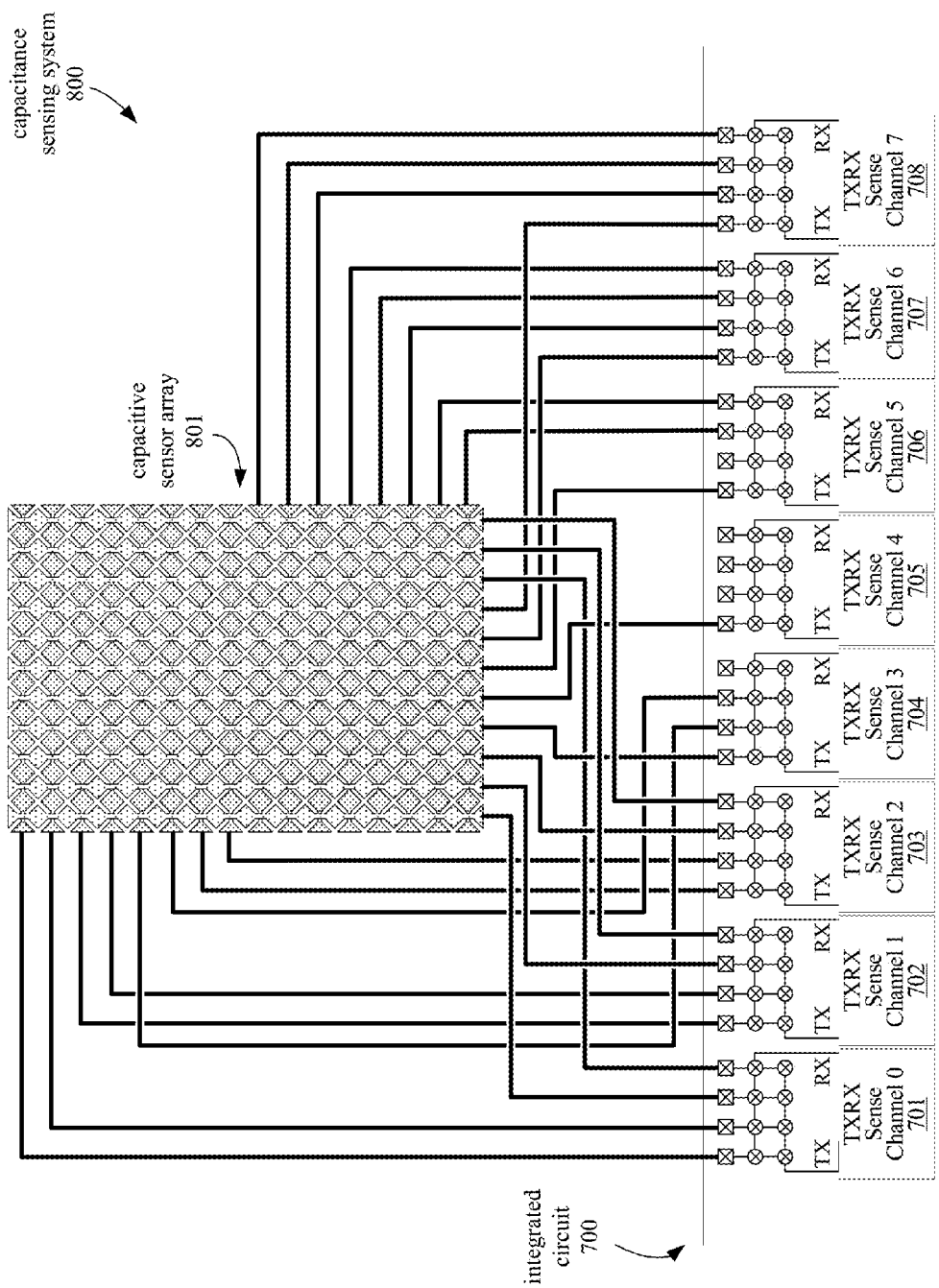
FIG. 8 illustrates connections between sensor elements and sense channels of a touchscreen controller, according to an embodiment.

FIG. 8 illustrates a routing diagram for a capacitive sensing system 800 having a capacitance sensing integrated circuit device 700 where each of the sensor electrodes of a capacitive sensor array 801, which may be similar to sensor array 501 as illustrated in FIG. 5, are connected to pins of the device 700. The routing in FIG. 8 is optimized to map the column electrodes to the separate RX sense channels 701-708 to allow them to be sensed in parallel. No such optimization is done for the row electrodes which are connected to any nearby available pin of device 700. The physical mapping of the device 700 as illustrated in FIG. 7 is represented for clarity as a linear row of pads in FIG. 8. For the noted optimization, the routing layout illustrated in FIG. 8, in contrast to the layout of FIG. 5, is significantly more complex and includes a greater number of trace crossovers and layers.

In one embodiment, a touchscreen system may maximize the speed at which a full capacitance measurement scan of the sensor array is performed by using as many sensing channels in parallel as possible. Since the capacitive sensor array 801 includes 11 column sensor electrodes to connect to RX sense channels 701-708 (numbered from 0 to 7) and the integrated circuit device 700 includes eight sense channels 701-708, the device 700 will use at least two passes to measure a capacitance for all columns.

In an alternative embodiment, fewer than all of the sensing channels 701-708 may be used to measure capacitances from the sensor array 801. For example, one implementation may use only six of the total RX channels to measure the screen, covering six columns in a first pass and re-using five of these same RX channels in the second pass. For normal fine scan operations (wherein all row/column intersections of the sensor array 801 are measured for changes in mutual capacitance), such a 6/5 split would provide a more constant power dissipation as compared to scanning a first set of eight columns followed by a second set of three columns. Power while sensing is roughly composed of an approximately constant TX power, plus the power from the number of RX channels enabled. Thus the most even power loading occurs by using only six RX channels for the first pass, and five for the second pass (totaling 11). Because there are a total of 16 rows to be driven by the TX signal, and two passes are required to measure the associated columns, the capacitance sensing system 800 as illustrated in FIG. 8 may perform 32 sense operations to measure all intersections, which may be constant regardless of whether the columns are allocated to RX sense channels in combinations of 8/3, 7/4, or 6/5.

In one embodiment, a capacitance sensing integrated circuit may utilize a more intelligent window scanning method to scan for changes in capacitances only within a portion, or window, of a touchscreen around an area where a finger or other conductive object is located. In one embodiment, the boundaries of the window are determined by a last known location of a conductive object being tracked.

FIG. 8 also illustrates an embodiment of a capacitance sensing device having eight RX channels that are connected so that any window that is eight columns wide, and starting at any row and column, can be measured in a single pass. Thus, for every possible window of eight adjacent sensor elements, each of the sensor elements may be connected to a different RX channel at the same time. For example, capacitance sensor array 801 has column sensor electrodes that are connected, from left to right, to sense channels 0, 1, 2, 3, 4, 5, 6, 7, 0, 1, and 2. Within the set of 11 column sensor elements, no group of eight contiguous sensor elements is connected to the same RX channel. Since all of the sense pins on this device may be used for a TX (or RX) function, they can be connected to any nearby pin with no specific requirement or relationship to an available RX channel. The RX channels themselves are allocated both to allow measurement of contiguous regions, and to support finger tracking.

In one embodiment, the capacitance sensing integrated circuit to sensor electrode connections must be managed on both X and Y axes to optimally support both self and mutual capacitance capabilities. For instance, both self and mutual capacitance measurements may be used to support water identification and rejection functions.

Figure 9:
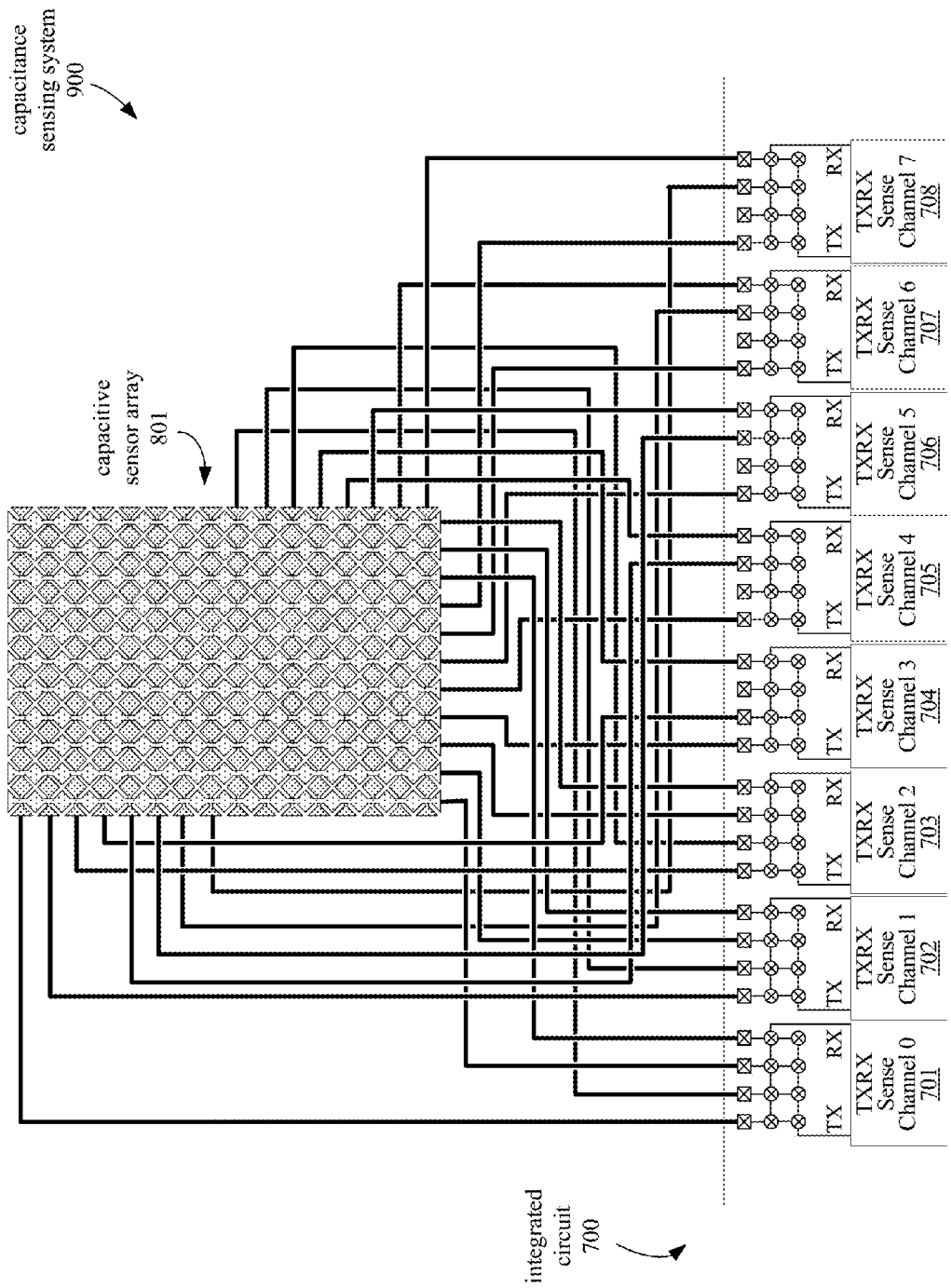
FIG. 9 illustrates connections between sensor elements and sense channels of a touchscreen controller, according to an embodiment.

For example, FIG. 9 illustrates a remapping of the row connections illustrated in FIG. 8. In one embodiment, a capacitance sensing system 900 has sensor array 801 having 16 total rows and divides the connections into two balanced groups of eight, wherein each group of eight rows may also be switched to non-overlapping windows of RX sensing channels. Within each of the two groups of eight, connections are made such that each RX sense channel is used only once. Any other combination would add a third measurement pass to this axis of the sensor array.

In one embodiment, a sliding window may be implemented that supports self-capacitance scanning with windowing of both rows and columns. A capacitance sensing device may use this method, for example, to permit water rejection functions around touches located using finger tracking.

The row connections as illustrated in FIG. 9 are arranged to support a fully sequential mapping to the RX measurement channels. From top to bottom, the rows of capacitive sensor array 801 are connected to sense channels 0, 1, 2, 3, 4, 5, 6, 7, 0, 1, 2, 3, 4, 5, 6, and 7, respectively. By this arrangement, it is possible to select any contiguous group of eight adjacent row sensor electrodes and measure them in parallel. The trace routing of capacitance sensing system 900 is yet more complex than the routing of sensing system 800, illustrated in FIG. 8.

In one embodiment, with both columns and rows supporting sequential capacitance measurement, it is also possible to measure mutual capacitances by driving (TX) the vertical columns and measuring the coupled charge onto the rows. Since the rows (in this configuration) allow a more efficient use of the RX channels, it is actually possible to measure the touchscreen faster. For a capacitive sensor array having 16 rows, the entire touchscreen may be measured in two passes just as before, but now all eight RX channel are used in each measurement (instead of six or five as in the configuration illustrated in FIG. 8). By driving (TX) the columns and measuring (RX) the rows it is possible to complete measuring the mutual capacitance on this same exemplary screen in only 22 sets of parallel measurements (as compared to the 32 measurements when driving the rows and measuring the columns as in FIG. 8).

Figure 10:
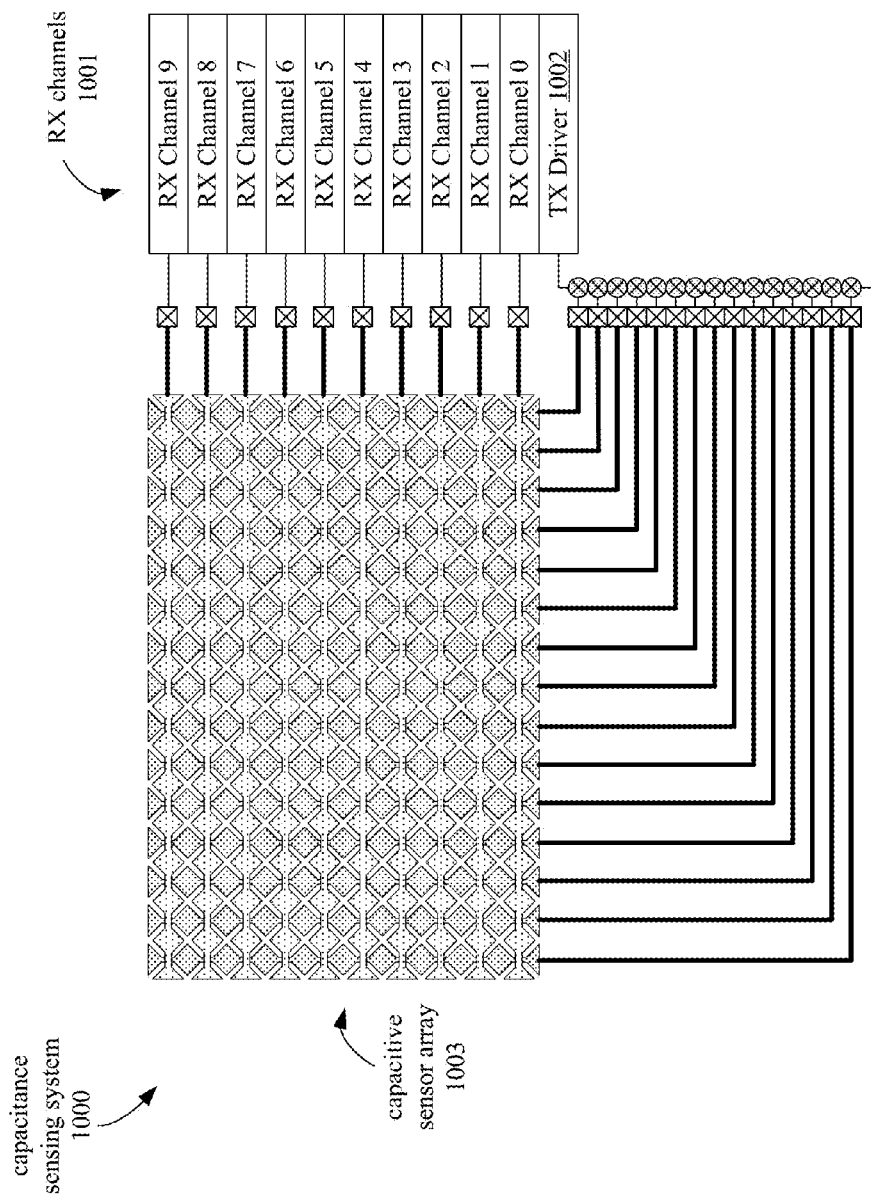
FIG. 10 illustrates connections between sensor elements and sense channels of a touchscreen controller, according to an embodiment.

FIG. 10 illustrates a capacitance sensing system 1000 that includes a capacitive sensor array 1003 coupled with a set of 10 RX channels 1001 (numbered 0-9) and a TX driver 1002. Capacitive sensing system 1000 has a fixed allocation of 15 TX columns and 10 rows connected to RX sense channels 1001. System 1000 does not include a multiplexer for the RX sense channels 1001 because there is a 1:1 correspondence between sense channels 1001 and row sensor electrodes.

In one embodiment, a single TX driver may be switchably connected to each of the column sensor electrodes in the sensor array 1003; alternatively, the system 1000 may include a TX driver for each TX-capable pin.

Figure 11:
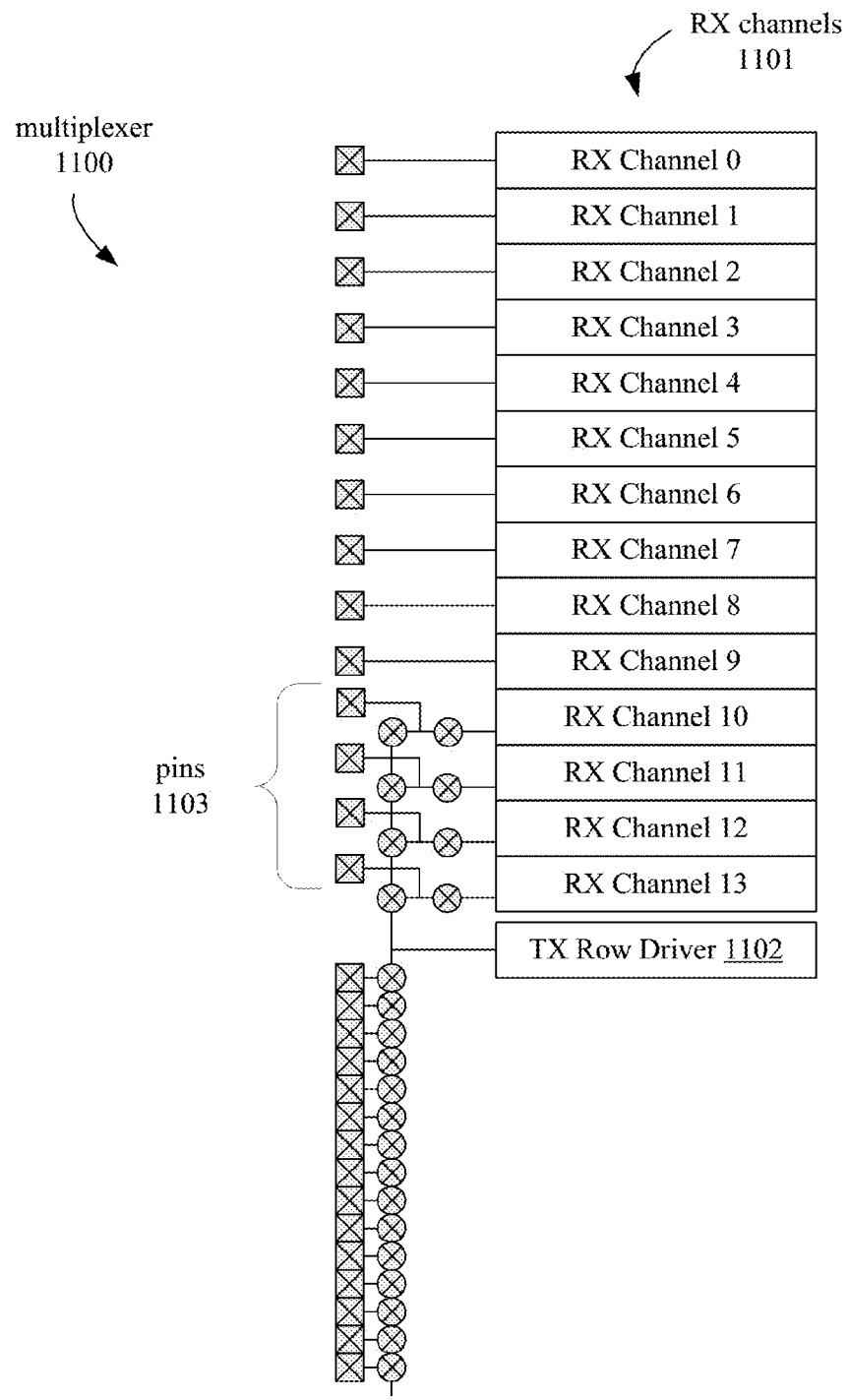
FIG. 11 illustrates a pin mapping for a multiplexer, according to an embodiment.

FIG. 11 illustrates an embodiment of a multiplexer 1100 for a capacitance sensing device having 14 RX sense channels 1101 (numbered 0-13) and a TX row driver 1102. Of the RX sense channels 1101, 10 are fixed function RX sense channels. Four pins 1103 may be configurable via switches to connect to either one of the four remaining RX channels 1101 (10-13), or to the TX row driver 1102.

Figure 12:
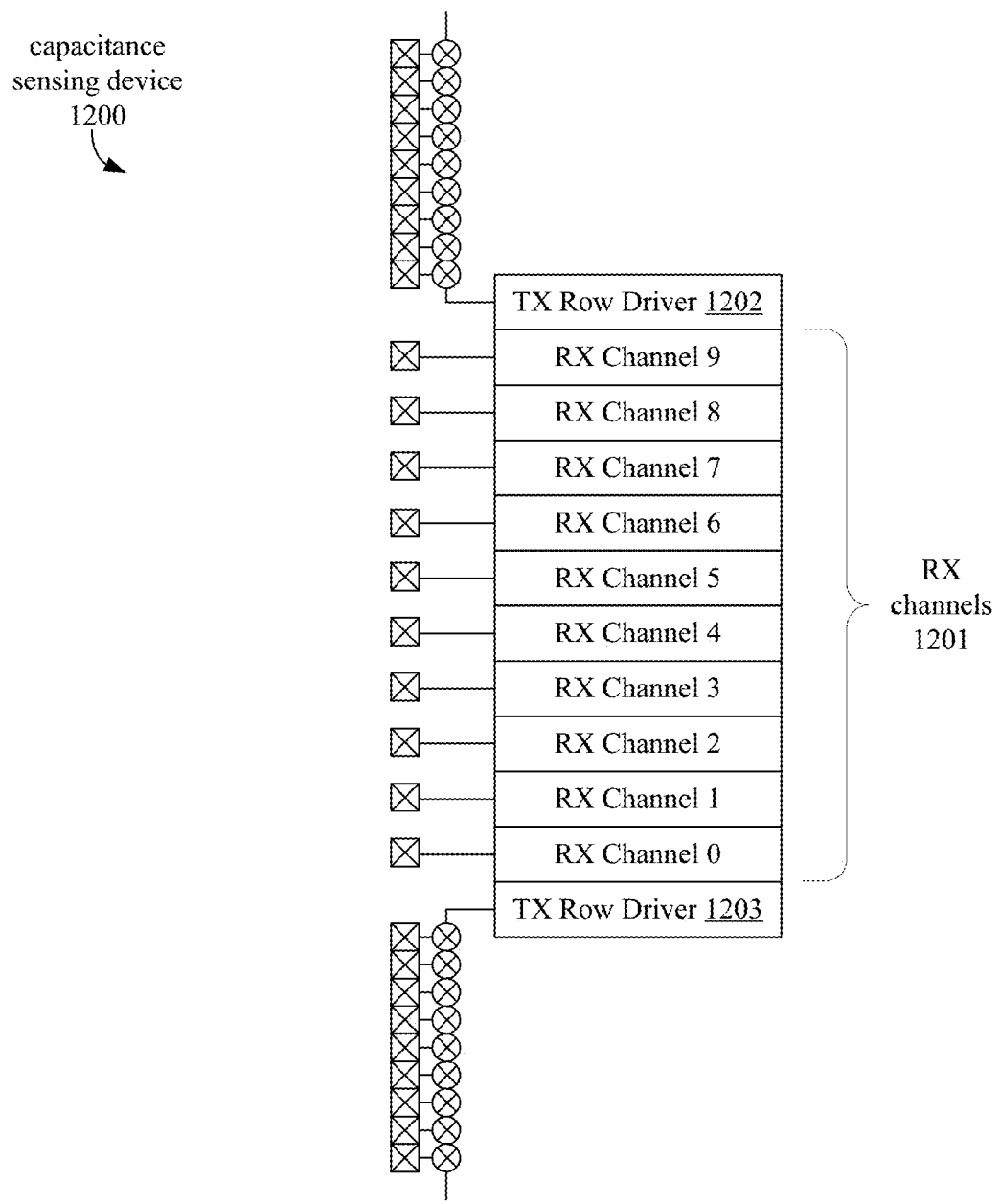
FIG. 12 illustrates a pin mapping for a capacitance sensing device, according to an embodiment.

FIG. 12 illustrates an embodiment of a pin layout for a capacitance sensing device 1200. In device 1200, the RX channels 1201 (numbered 0-9) are connected to pins in the center of the device 1200, with TX drivers 1202 and 1203 connected to pins at either side of the central RX pins.

In one embodiment, devices implementing the foregoing pin layouts are optimally routed when the device is placed in a particular position relative to the capacitive sensor array.

Figure 13:
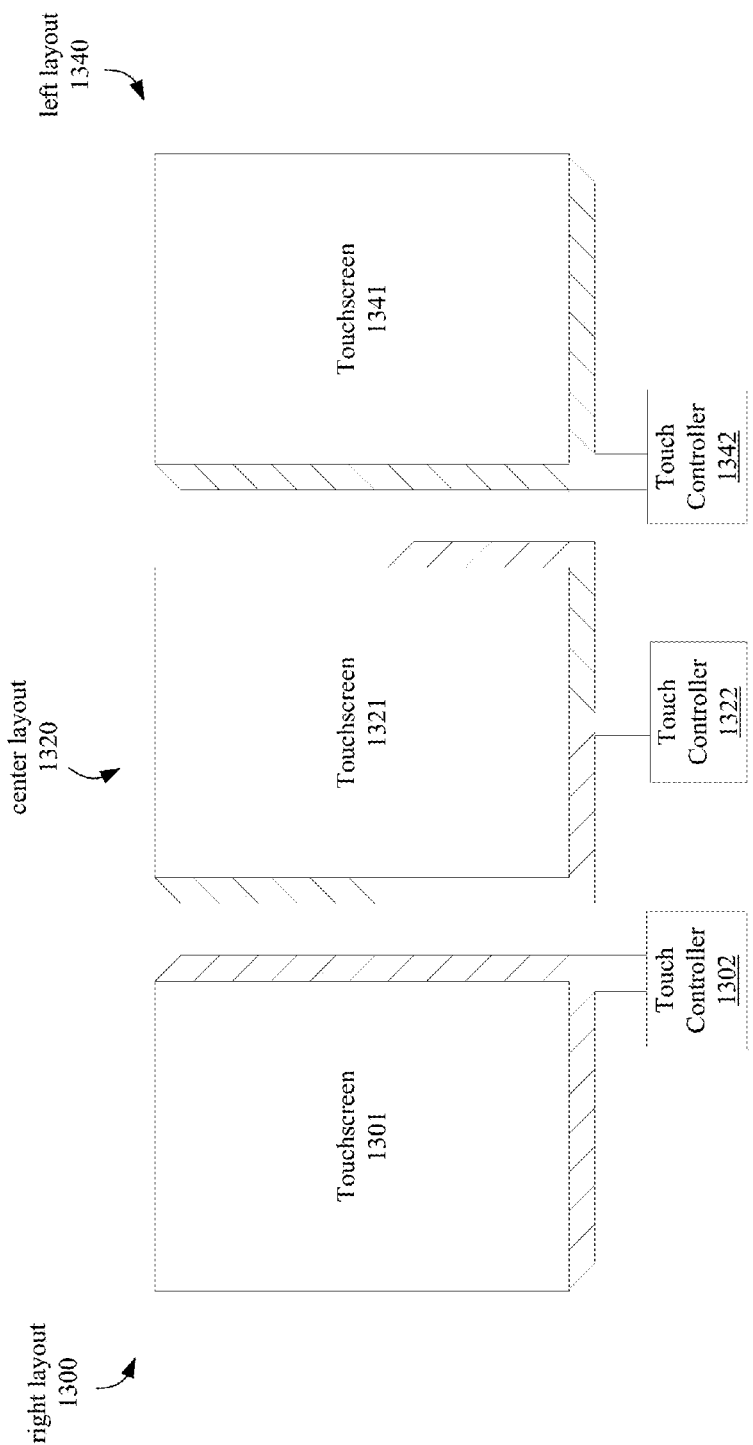
FIG. 13 illustrates possible layouts for a touchscreen relative to a touchscreen controller, according to an embodiment.

For touch controller systems that support a small number of mutual capacitance sensing channels, and where the RX measuring circuits also only connect to the narrow end of the capacitive sensor array, there are three physical placements of the touch controller relative to the touchscreen, according to an embodiment. These are illustrated in FIG. 13. The right layout 1300 includes a touch controller device 1302 that is placed in line with a right side of the touchscreen 1301. The center layout 1320 includes a touch controller 1322 that is placed along a central axis of the touchscreen 1321. The left layout 1340 includes a touch controller 1342 that is placed along a left edge of the touchscreen 1341.

In one embodiment, the capacitance sensing device 1200, as illustrated in FIG. 12, for example, may be optimally routed according to a central layout 1320; however, the same device 1200 may have approximately half of its TX driver connections routed across RX lines if routed according to either the left layout 1340 or right layout 1300. The controller device 1100, as illustrated in FIG. 11 would be optimally routed according to the left layout 1340, but would have to route many or all of the TX signals across the RX lines for either the center layout 1320 or right layout 1300.

In one embodiment, a capacitance sensing device that is capable of measuring both (or either of) rows and columns, which requires connection of the RX sensing circuits to all electrodes of both rows and columns, there are six placements for a touch controller. These placements include the right 1300, left 1340, and center 1320 layouts, as illustrated in FIG. 13, in addition to a variant of each wherein the columns are measured for mutual capacitance or the rows are measured for mutual capacitance (these same rows and columns may also be measured for self-capacitance if supported by the touch controller).

Figure 14:
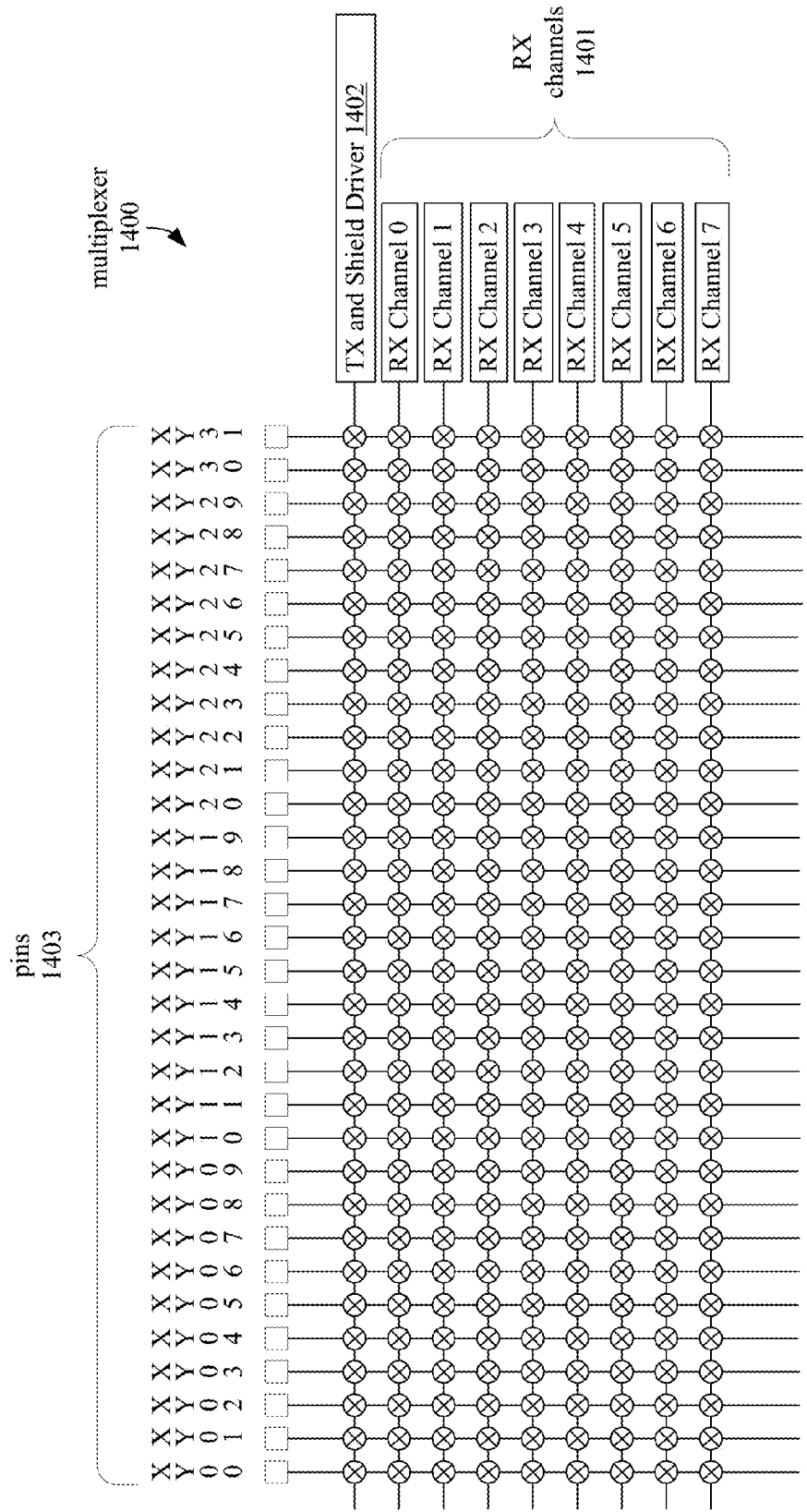
FIG. 14 illustrates an embodiment of a fully populated RX multiplexer.

FIG. 14 illustrates an embodiment of a multiplexer 1400 for a capacitance sensing device. In general, a multiplexer may connect $N_{TOTAL}$ sense channels with $M_{TOTAL}$ pins. In particular, multiplexer 1400 is capable of connecting any of eight RX sense channels 1401 (numbered 0-7) with any of 32 pins (numbered 0-31) via switch. Multiplexer 1400 is also capable of connecting a TX driver 1402 with any of the 32 pins. Thus, in one embodiment, a multiplexer 1400 may have $N_{TOTAL}$ that is at least 8 and $M_{TOTAL}$ that is at least 32.

A fully-populated switch structure such as that of multiplexer 1400 would allow connection of any touch screen electrode to any RX sense channel (or any pin to a TX driver). To support eight RX channels across 32 sense-capable pins would require 256 addressable switches, in addition to those required for TX support.

In one embodiment, this large number of switches may consume significant area on the die. Note that each switch may also require registers to select/maintain their state, plus decoders, buffers, etc. for each register. Each switch may also add capacitance to its respective bus. In one embodiment, these switches may also be updated each time there is a change in connectivity, incurring processing overhead for effecting these changes.

Figure 15:
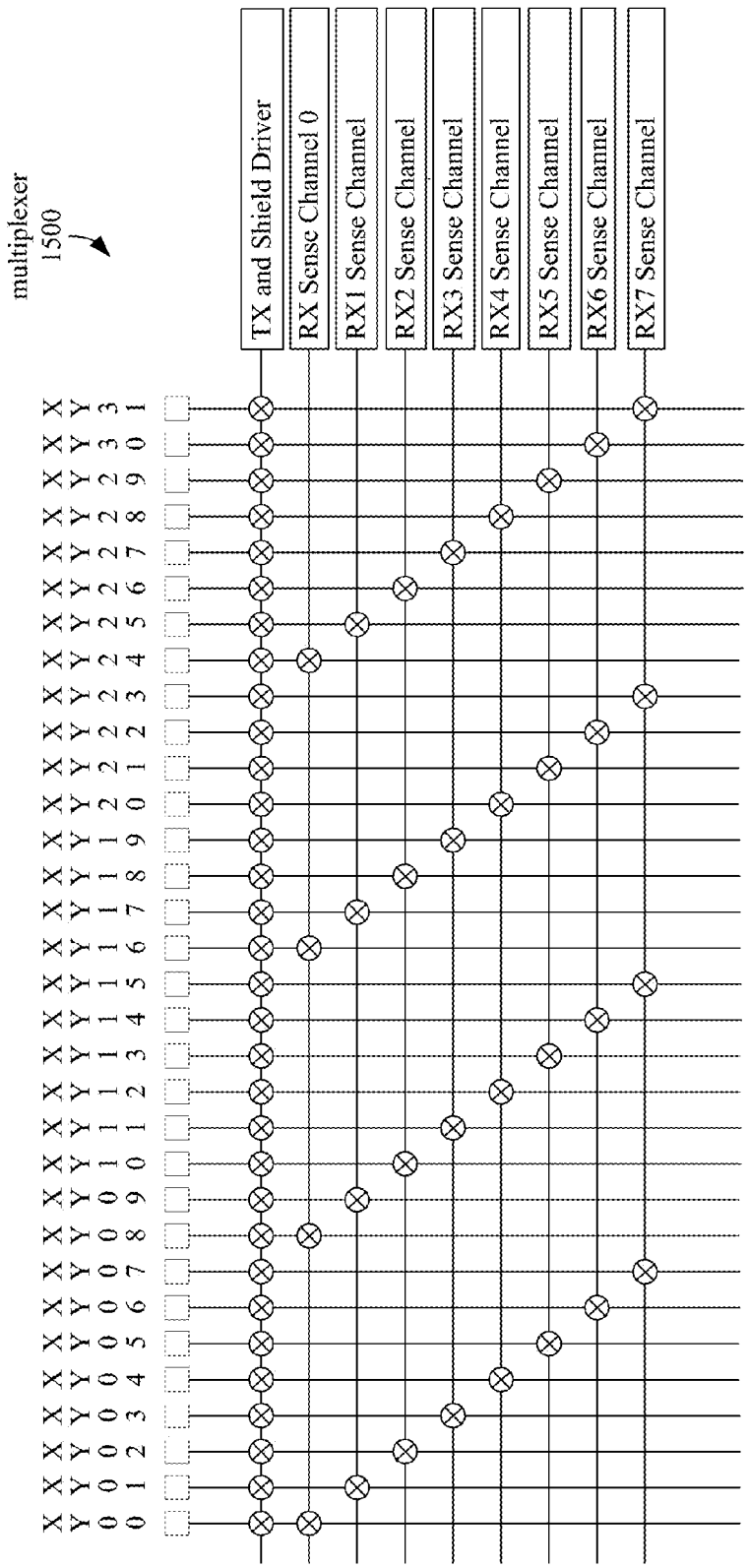
FIG. 15 illustrates an embodiment of a partially depopulated RX multiplexer.

In one embodiment, the matrix illustrated in FIG. 14 may be significantly depopulated without losing performance. By only allowing connectivity of each RX sense channel to specific pins, wherein those pins occur in a modulo order on the device, a factor N reduction in switches can occur, where N is the number of RX sensing channels on the device. FIG. 15 illustrates an embodiment of a multiplexer 1500 implementing such a depopulated matrix.

In contrast with multiplexer 1400, multiplexer 1500 has 32 switches to allow any consecutive set of N pins to connect adjacent sensor electrodes on the touchscreen and the N RX sense channels available. Thus when making measurements, an extra pass is never forced due to the presence of the same RX channel on sensor electrodes within that group.

Figure 16:
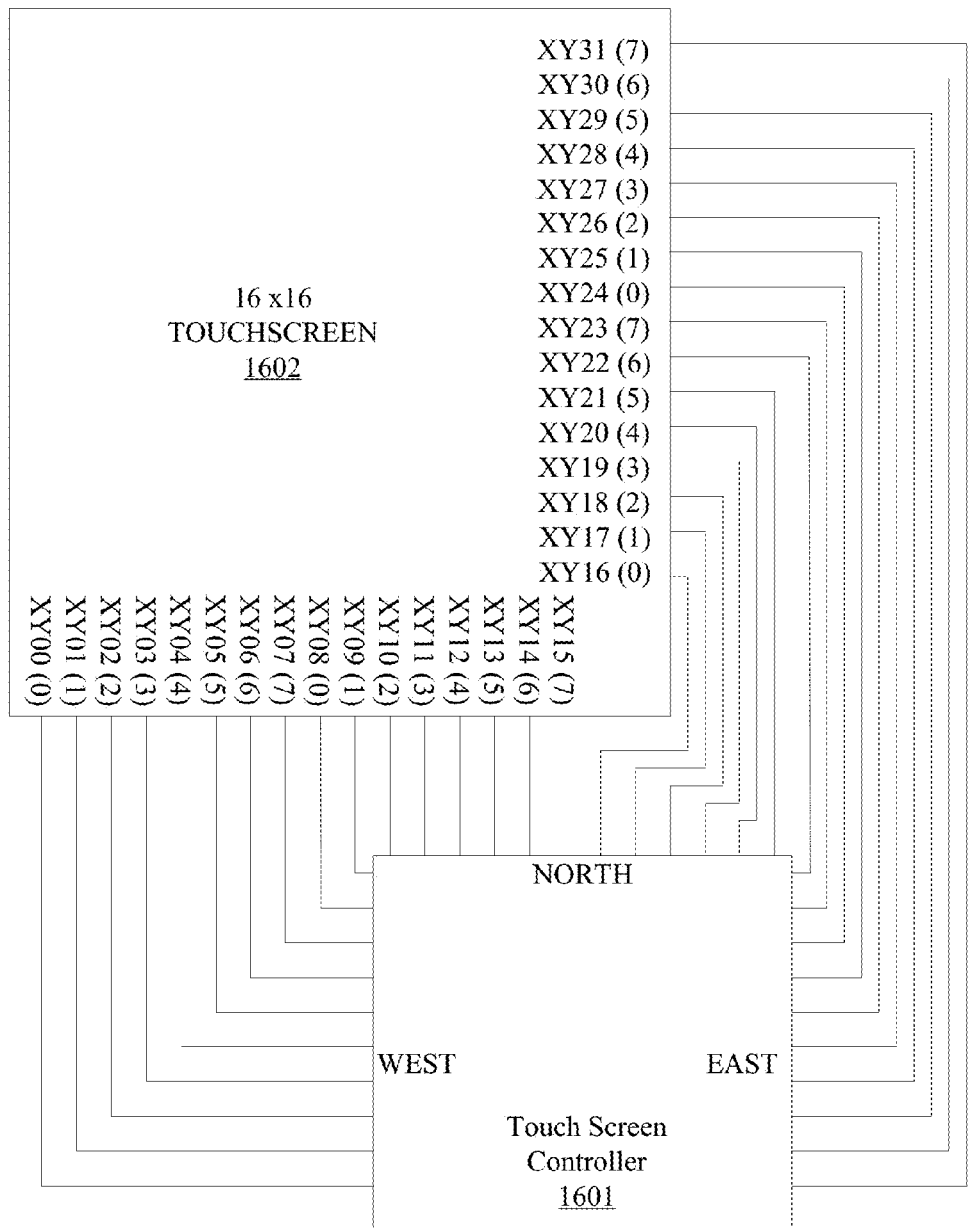
FIG. 16 illustrates a mapping of RX channels to a corner mounted touch screen controller, according to an embodiment.

FIG. 16 illustrates an embodiment of a touchscreen controller 1601, having RX channels mapped as per the reduced matrix in FIG. 15, coupled to the lower-right corner of a touchscreen 1602. The numbers in parenthesis identify which RX sense channel may be switched to that specific XY pin and touch screen electrode. Note that regardless of which axis of the touch screen were considered for RX or TX, it would be possible to route all connections between the touchscreen 1601 and controller 1602 with no crossovers, and any selected group of N contiguous electrodes could be measured in a single measurement.

Figure 17:
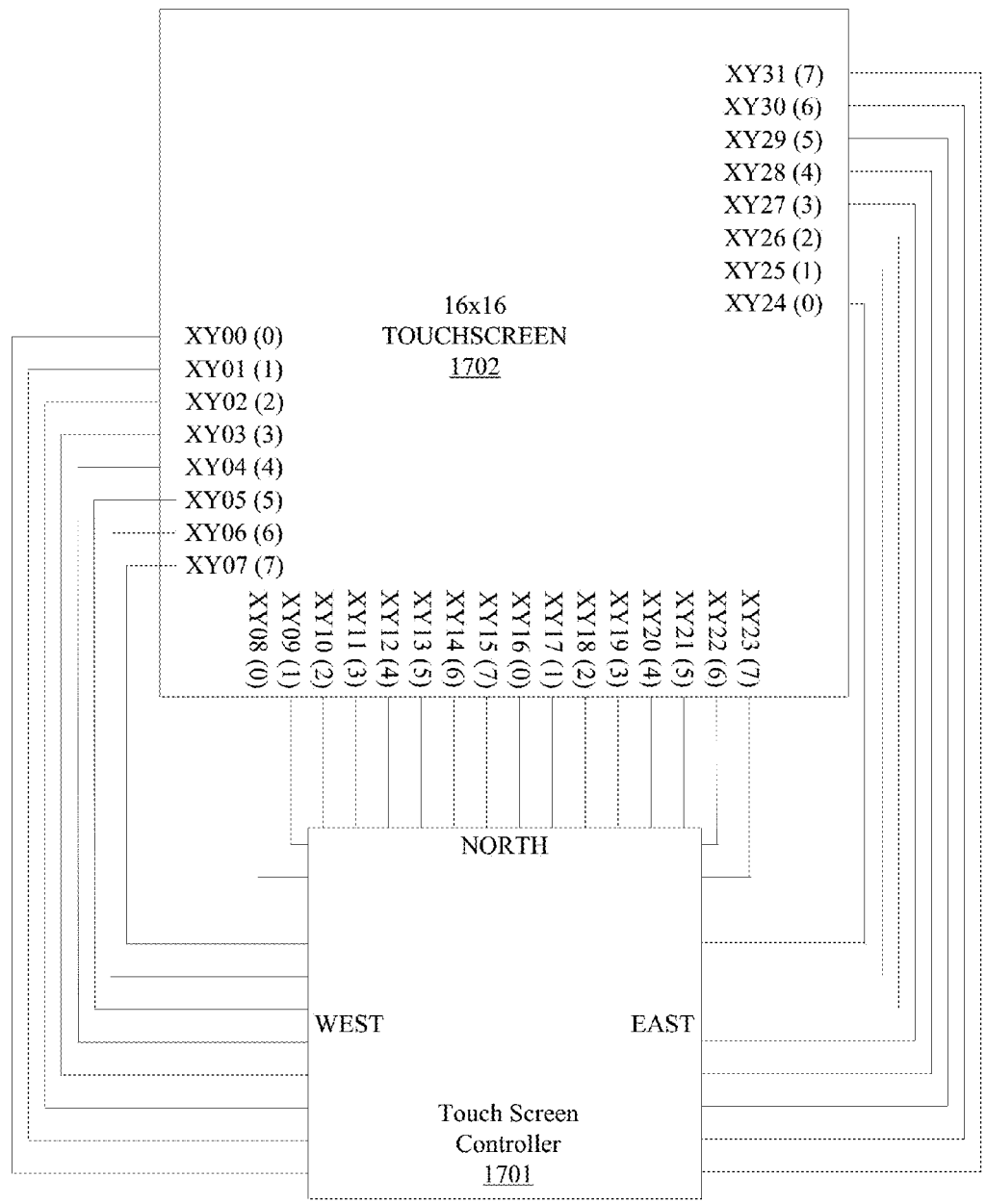
FIG. 17 illustrates a mapping of RX channels to a center mounted touch screen controller, according to an embodiment.

This depopulated structure in FIG. 15 allows meeting this criteria for five of the six possible placements. It does not meet this criteria for the 6th placement, that being center connected with RX sense channels connected to the left and right edges of the touch screen. FIG. 17 illustrates this 6th placement, according to an embodiment.

From top-to-bottom, the row connections of touchscreen 1702 are mapped according to the following sequence: 7654321001234567. Within this sequence, the top and bottom ends can provide connections to a contiguous group of N (8) RX sense channels, but any other position would have two or more electrodes mapped to the same RX sense channel. This is because when wrapped to the left side of the touch screen the RX sense channels are sequenced in one order, and when mapped to the right side they are mapped in the opposite order.

Figure 18:
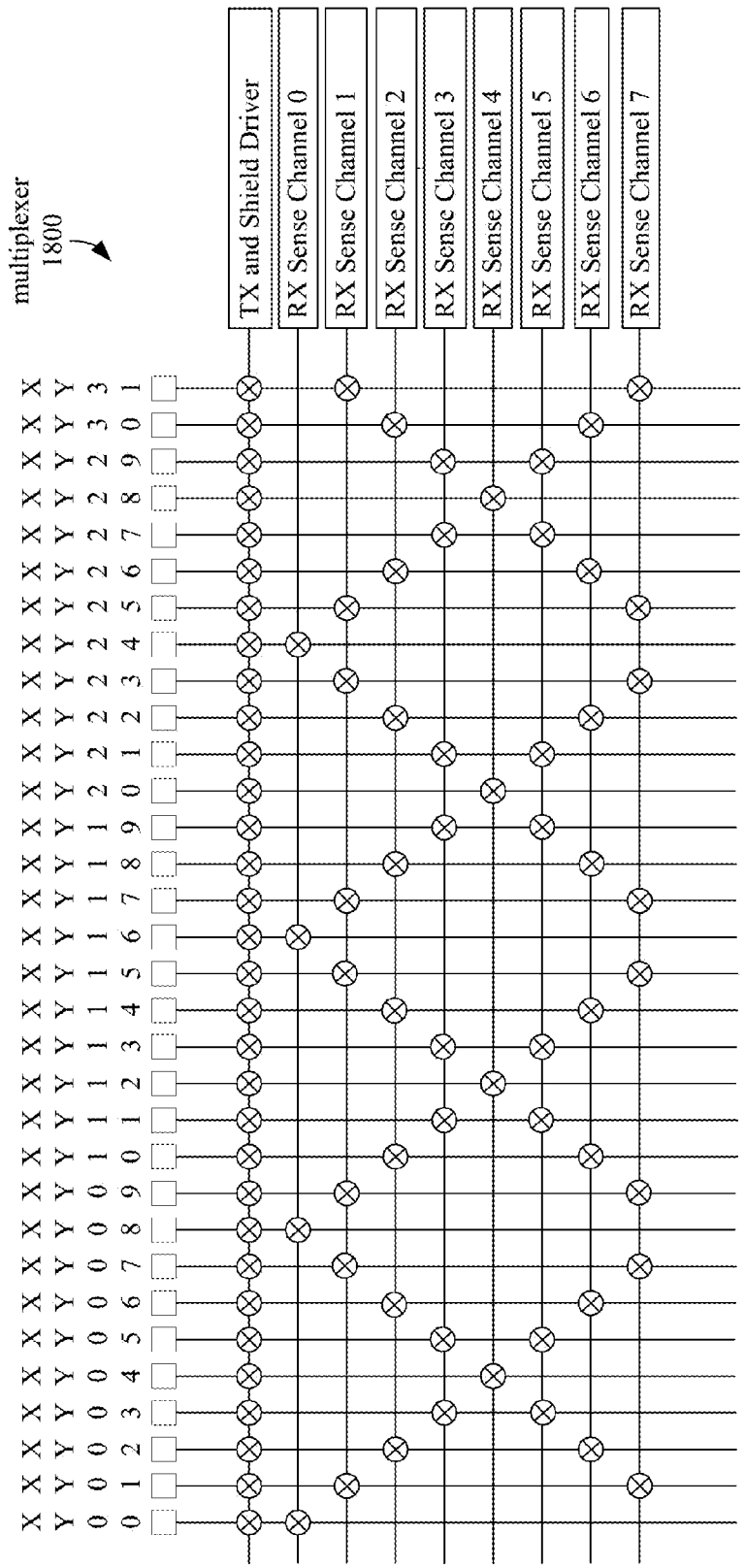
FIG. 18 illustrates an embodiment of a multiplexer having a bi-directional sequence of channel mapping switches.

In one embodiment, the 6th placement may be managed by dropping a row of vias and adding a second routing layer to the circuit board used to connect between the touch controller 1701 and the touch sensor 1702. This would allow either the left or right edge connections to the touchscreen to be reversed. Alternatively, one embodiment may include more switches to the depopulated matrix of multiplexer 1500, as illustrated in FIG. 15, such that either ascending or descending sequences are possible. An example of this embodiment is illustrated as multiplexer 1800 in FIG. 18. Note that such a switch population approximately doubles the number of switches in the RX portion of the multiplexer.

Figure 19:
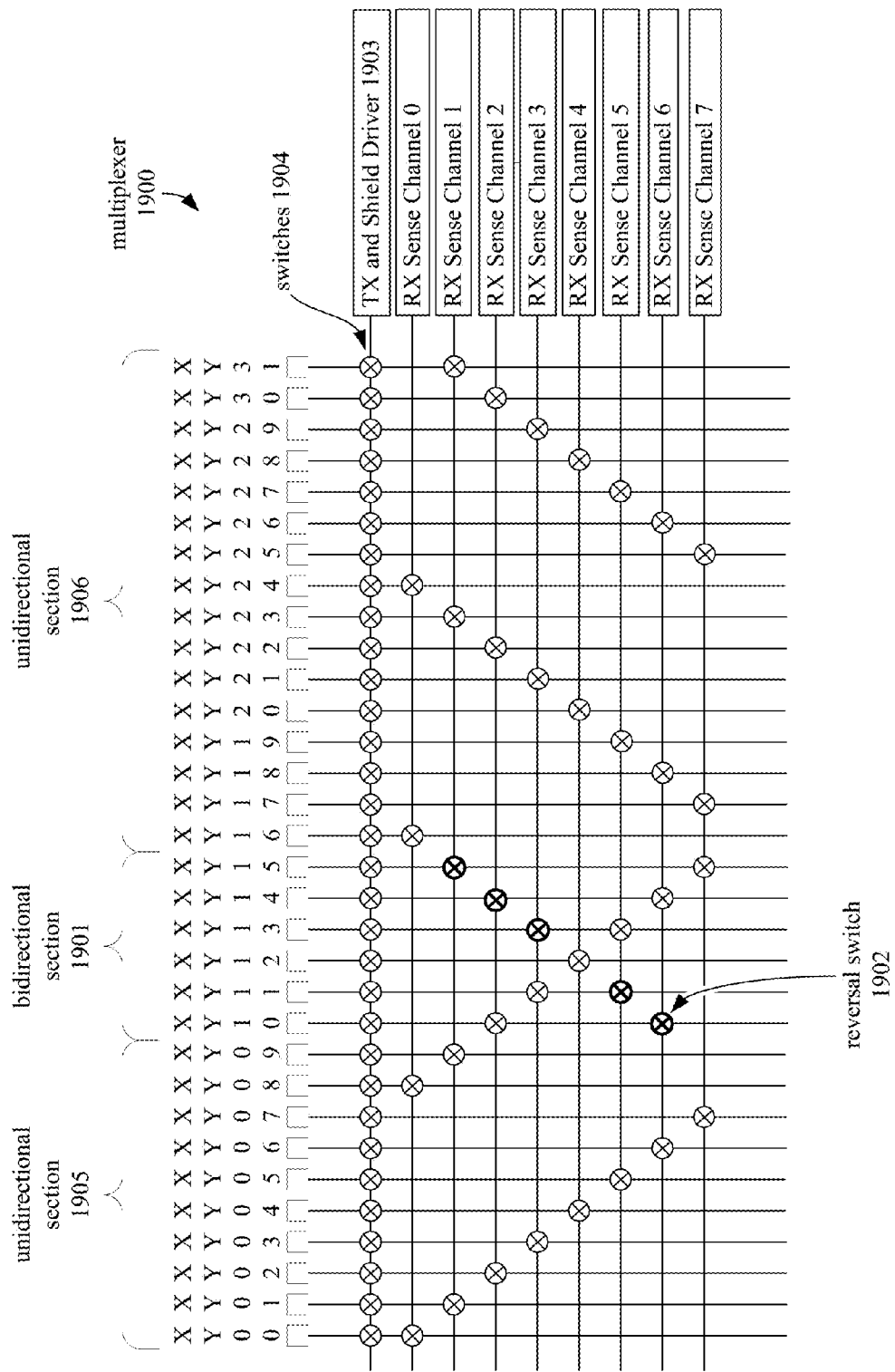
FIG. 19 illustrates an embodiment of a multiplexer implementing a bidirectional mapping section.

In one embodiment, only a portion of the matrix has the ability to be connected in both directions to fully support all six possible placements. In one embodiment, this bi-directional portion is in the center area of pins. In one embodiment, the matrix includes only one such section, regardless of how many XY pins are present on the touchscreen controller, or how many RX sense channels are on the device. An embodiment of multiplexer 1900 having an optimized matrix is shown in FIG. 19, with the bidirectional portion 1901 including a small number of additional switches for reversing, such as reversal switch 1902.

In one embodiment, the multiplexer circuit 1900 includes $N_{TOTAL}$ receive (RX) channel outputs and $M_{TOTAL}$ pins, where $M_{TOTAL}$ is greater than $N_{TOTAL}$. In one embodiment, each of the $M_{TOTAL}$ pins may be coupled to a TX signal source 1903 via a number of switches 1904.

In one embodiment, the $M_{TOTAL}$ pins may be grouped into subsets, where two or more subsets include pins that are each switchably coupled to one of the RX channels, while one subset of pins is switchably coupled to one of two of the RX channels. For example, each pin in the unidirectional sections 1905 and 1906 may be coupled via switch to one of the RX sense channels. In one embodiment, adjacent pins are each mapped to a different RX sense channel. In one embodiment, the mapping may be arranged to maximize the number of contiguous pins that are each mapped to a different RX sense channel. In one embodiment, for each possible subset of $N_{TOTAL}$ contiguous pins from the plurality of $M_{TOTAL}$ pins, each pin in the possible subset is switchably coupled to a different RX sense channel output.

Bidirectional section 1901 includes a subset of pins that may be coupled via switch to one of two of the RX sense channels. Notably, one pin (pin 12) within the bidirectional section 1901 may be coupled via switch to one RX sense channel rather than two, since this pin would be connected to the same RX sense channel when the pins are mapped in either ascending or descending channel order.

In one embodiment, a number P may identify a spatial ordinal position of an RX sense channel and Q may identify a spatial ordinal position of a pin within one of the first, second, or third subsets of pins. In other words, P and Q may be integers indicating the ordinal position in which a pin or channel is arranged spatially. Using this notation, every $Q^{th}$ pin within a first subset may be switchably coupled to an (Q mod $P_{TOTAL})^{th}$ channel. An $Q^{th}$ pin within the second subset may be switchably coupled to an $((Q_{TOTAL}-Q) \bmod P_{TOTAL})^{th}$ channel. An $Q^{th}$ pin within a third subset may be switchably coupled to either of an (Q mod $P_{TOTAL})^{th}$ channel or an $((Q_{TOTAL}-Q) \bmod P_{TOTAL})^{th}$ channel.

In one embodiment, the sections 1905, 1901, and 1906 may be seen as mapping regions, where within each mapping region, the pins may be mapped in different orders. For example, the pins within section 1905 are mapped to RX sense channel outputs according to a first order, the pins in section 1906 are mapped to RX sense channel outputs according to a second order that is the reverse of the first order, and the pins in section 1901 are mapped to the RX sense channel outputs according to either the first or second orders.

In one embodiment, the pins may be assigned to RX channels as shown in Table 1. As shown in Table 1, there is no starting pin offset where the group of $P_{TOTAL}$ consecutive pins cannot all be mapped to an open RX sense channel.

TABLE 1

| Starting XY Pin | RX channel map through reversed region<br>RX Sense Channel Map |
|---|---|
| 08 | 01234567------- |
| 09 | -12345670------ |
| 10 | --65432107----- |
| 11 | ---54321076---- |
| 12 | ----43210765--- |
| 13 | -----32107654-- |
| 14 | ------21076543- |
| 15 | -------10765432 |

In one embodiment, the bidirectional reversal section 1901 includes five additional switches over that of a unidirectional mapping. It is also possible to position these switches in other offsets in the matrix to serve the same purpose.

The structure illustrated in FIG. 19 is sufficient for mapping all standard self and mutual capacitance sensing modes. Architecturally, it is also extensible to more or fewer XY sense pins, or more or fewer RX channels, through simple rules. Any number of pins may be added or removed from the overall structure by doing so at either end. When adding pins, all that is needed is for the associated mux switch to support the next sequential RX channel.

The optimized multiplexer 1900 may be used in a capacitance sensing system including a transmit (TX) signal generator and a plurality of $P_{TOTAL}$ receive (RX) channels. In one embodiment, the capacitance sensing system may include a capacitance sensor that is configured to measure a self-capacitance of a sensor electrode connected to at least one of the plurality of $Q_{TOTAL}$ pins. In one embodiment, the capacitance sensing system may be configured to measure a mutual capacitance between a first sensor electrode coupled with a first pin of the of the plurality of $Q_{TOTAL}$ pins and a second sensor electrode coupled with a second pin of the plurality of $Q_{TOTAL}$ pins.

In one embodiment, a capacitance sensor may perform a window scan or series of window scans, where each window scan includes capacitance measurements for a set of contiguous sensor elements.

In one embodiment, entire blocks or groups of pins may be added or removed in the middle of a pin sequence. This arrangement may be used to accommodate mapping of a single die into different packages, where these alternate packages support more (or fewer) XY sense pins. By ensuring that any pins added or dropped occur modulo N (where N is the number of RX sense channels), this can be made transparent to the user.

Figure 20:
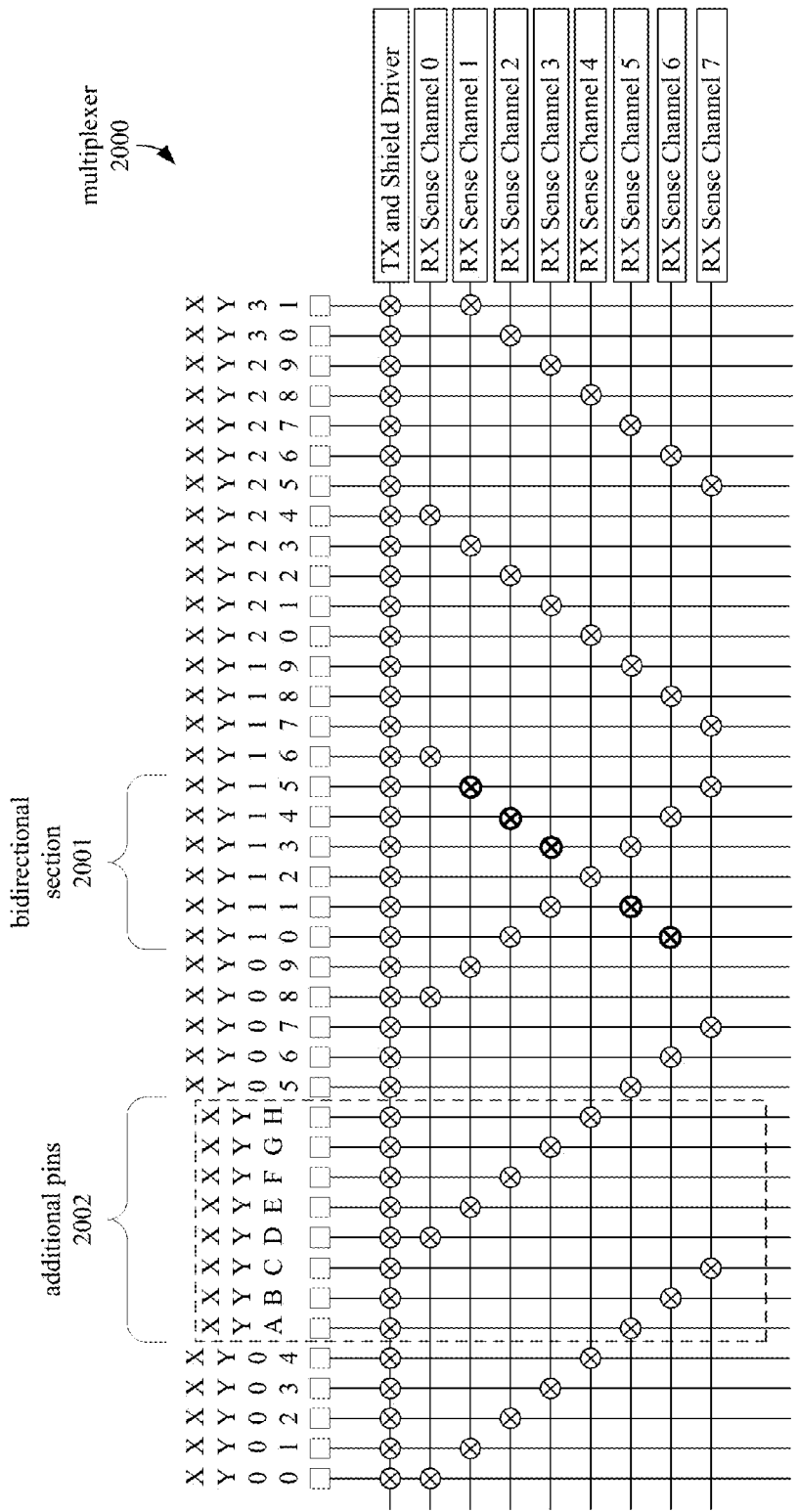
FIG. 20 illustrates an embodiment of a multiplexer implementing a bidirectional mapping section and added pins.

FIG. 20 illustrates an embodiment of a multiplexer circuit 2000 having a bidirectional section 2001 and with a group of pins added (relative to the previously illustrated embodiments) to expand it from 32 sense-capable pins to 40. The added pins 2002 and multiplexer switches are shown with a dashed border box and are labeled XY[A:H].

The additional pins 2002 are located in the middle of the pin sequence, as compared to the previous embodiments. In one embodiment, the additional pins 2002 may be added at any location in the sequence. In one embodiment, the number of pins in the additional group of pins is equal to the number of RX sense channels. In the illustrated example where there are eight RX channels, the number of pins added in the middle may be in multiples of eight. In one embodiment, the additional pins 2002 may continue the sequence of RX channels such that the presence of the additional pins 2002 is transparent to the user. If the additional pins 2002 are not bonded out in a package, this example device appears to the user as 32 sequentially mapped XY sense pins. If these additional pins 2002 are bonded out, the device appears as having 40 sequentially mapped XY sense pins.

Figure 21:
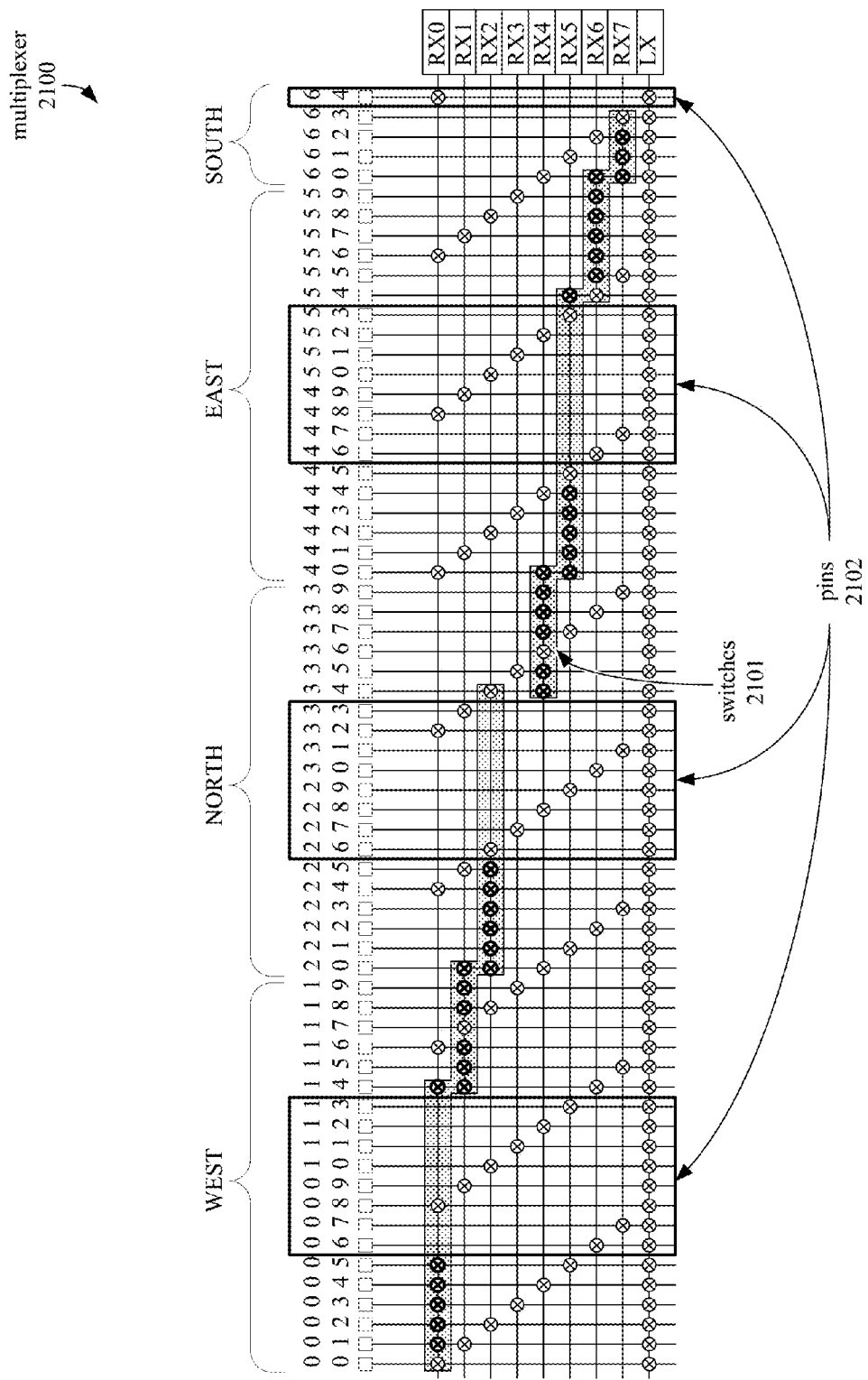
FIG. 21 illustrates a switch mapping for a multiplexer, according to an embodiment.

FIG. 21 illustrates a multiplexer circuit 2100 including pins numbered 00-64 and RX sense channel outputs labeled RX0-RX7. The multiplexer 2100 also includes a connection for a noise monitor channel LX. The north, south, east, and west regions indicate the placement of the pins on different sides of an integrated circuit package.

In one embodiment, the pins 2101 are XY sense pins that may be left unconnected when placed in a small package such as a 48-pin QFN, while when connected into a larger package (e.g., 80-pin or greater) all of these pins may be connected to support a much larger touch screen.

In one embodiment, a coarse scan of an array of sensor electrodes may include a series of group scans, where each group scan includes a number of simultaneous capacitance measurements for a set of contiguous sensor elements. In an alternative embodiment, the sensor elements in the group scan may be non-contiguous.

In one embodiment, a system supporting group scanning, either in addition to or as a replacement for finger tracking, may support the groups scanning by extending this same matrix through addition of group scanning switches 2101, which are configured to connect each of the $P_{TOTAL}$ RX channel outputs with each pin of a group of contiguous pins. In one embodiment, the multiplexer circuit 2100 may support several such groups of contiguous pins. In one embodiment, the groups of contiguous pins may share pins in common. In other words, each group of contiguous pins may include one or more pins included in another group of contiguous pins, such that the groups overlap. The switches 2101, as illustrated in FIG. 21, would support an overlapped coarse scan operation for groups that are four sense electrodes in width.

Figure 22:
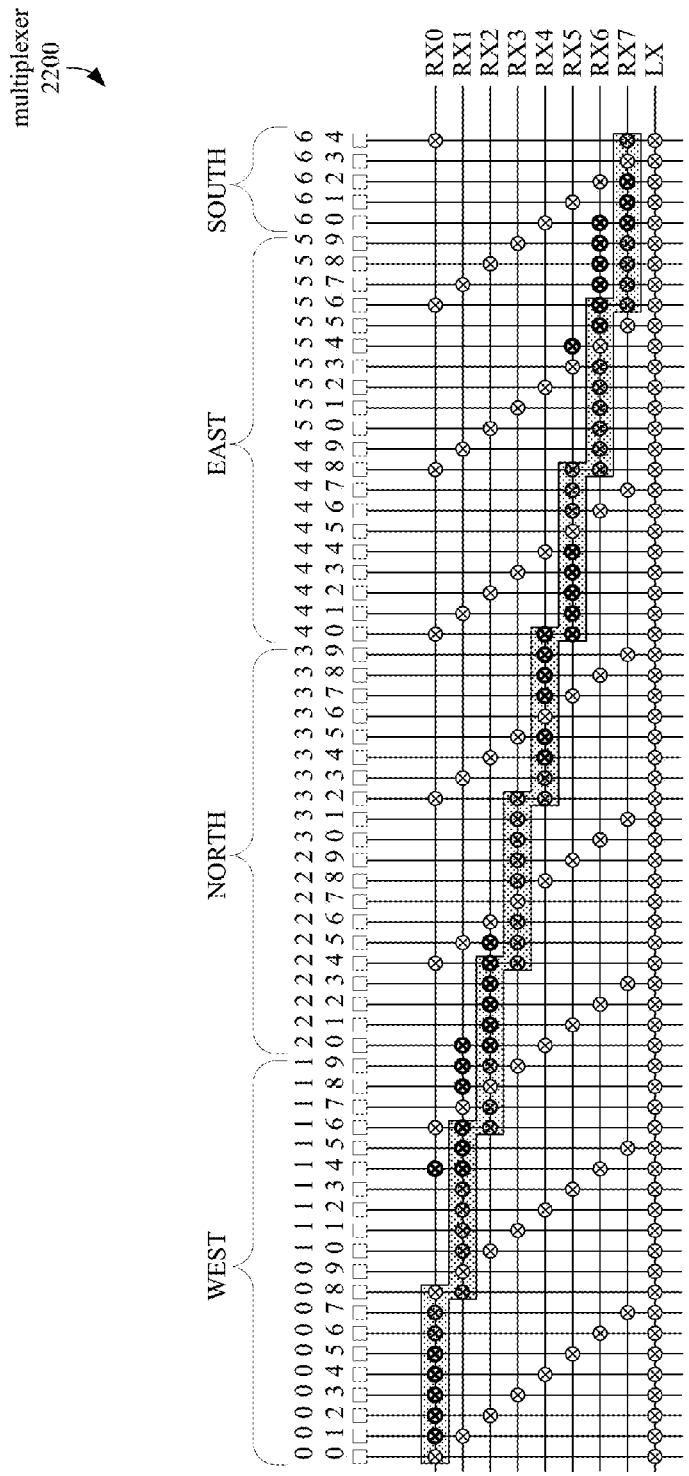
FIG. 22 illustrates a switch mapping for a multiplexer, according to an embodiment.

In one embodiment, a larger coarse scan group may also be supported. For example, FIG. 22 illustrates an embodiment of a multiplexer circuit 2200 that has been extended (relative to the switch matrix of multiplexer circuit 2100 in FIG. 21) to support 4-wide coarse scanning when in small packages, and 5-wide coarse scanning when in wide packages. With minor modifications to the matrix, adjacent block scanning may also be supported.

The above-described embodiments focus primarily on the RX or sensing side of the implementation; however, similar enhancements may be made to the TX (charge forcing) side. As noted, the TX function drives charge through the mutual capacitance junctions shown in FIG. 6 and into and out of the RX sense electrodes. In one embodiment, the TX function includes a switch or driver capable of sourcing or sinking charge. Alternatively, the TX function may include a simple pair of transistors that switch between supply and ground, or may be a more complex circuit having constrained current sources, slope control, alternate supplies, charge pumps, and pre-drive circuits to speed up charging of the entire sense electrode connected to the sensing device pin.

In one embodiment, the TX function may be implemented using a digital output that provides a square wave. This is in effect a voltage-mode driver, wherein it continues to source or sink current (charge) until either the output has stabilized at a specific voltage level, or the control signals to the driver change state. In one embodiment, such a driver would exist at the pad, and before the multiplexer switch to connect that pad to an analog bus for measurement (as illustrated in FIG. 5).

In one embodiment having two analog mux buses (or one analog bus capable of being segmented into two), specific pins connectable to a first analog bus may be allocated to support the TX function, while those same pins connectable to a second analog bus may be allocated to support the RX function. In this case, the selection of which pins drive a TX waveform may be determined by the construction of the sensing integrated circuit, and how a TX signal is connected to that first analog mux bus.

In one embodiment, such a device may also have generic GPIO (general purpose input/output) drivers present at each pin (each independently programmable to source a static logic-1, high-Z, or logic-0). In this embodiment, it is also possible to use such GPIO circuits to ground (i.e., connect to logic-0) those sense electrodes not being used for TX, RX, active shield, or other capacitance sensing function. This method may be used so as to not allow a floating sensor to couple additional noise from the environment into adjacent sensors being measured.

In one embodiment, multiple RX sense channels may be included in a controller device (as illustrated in FIG. 7) along with additional levels of programmability. In one embodiment, so as to not overdrive the linear circuits in the RX sense channel, various levels of slope control may be added to the driver(s). In one embodiment, this may be accomplished by current limiting the driver for both charge and discharge current paths. A second level of programmability may be the addition of true or complement phase selection, such that the phase of the modulation function (i.e., the TX driver), relative to that of the demodulation function (within each RX sense channel), could be selected as in phase or out of phase. This may permit some forms of differential or multiphase TX generation.

As illustrated in FIG. 7, in one embodiment, each RX sense channel may include its own local TX driver, where each TX driver is configurable independently of the others. This allows each channel to source either a true TX signal, complement TX signal, or no TX signal (in addition to a parallel GPIO or logic circuit, which allows a grounding function), depending on its programmed configuration. Because there are only four pins that each TX driver may be switched to, this also sets a limit on the total charge that each driver must be sized to support. In one embodiment, when programmed for maximum loading, a single TX driver may source and sink current into up to four sensor electrodes. In one embodiment, this configuration of TX drivers may all source the same phase of TX signal (i.e., true or complement).

Figure 23:
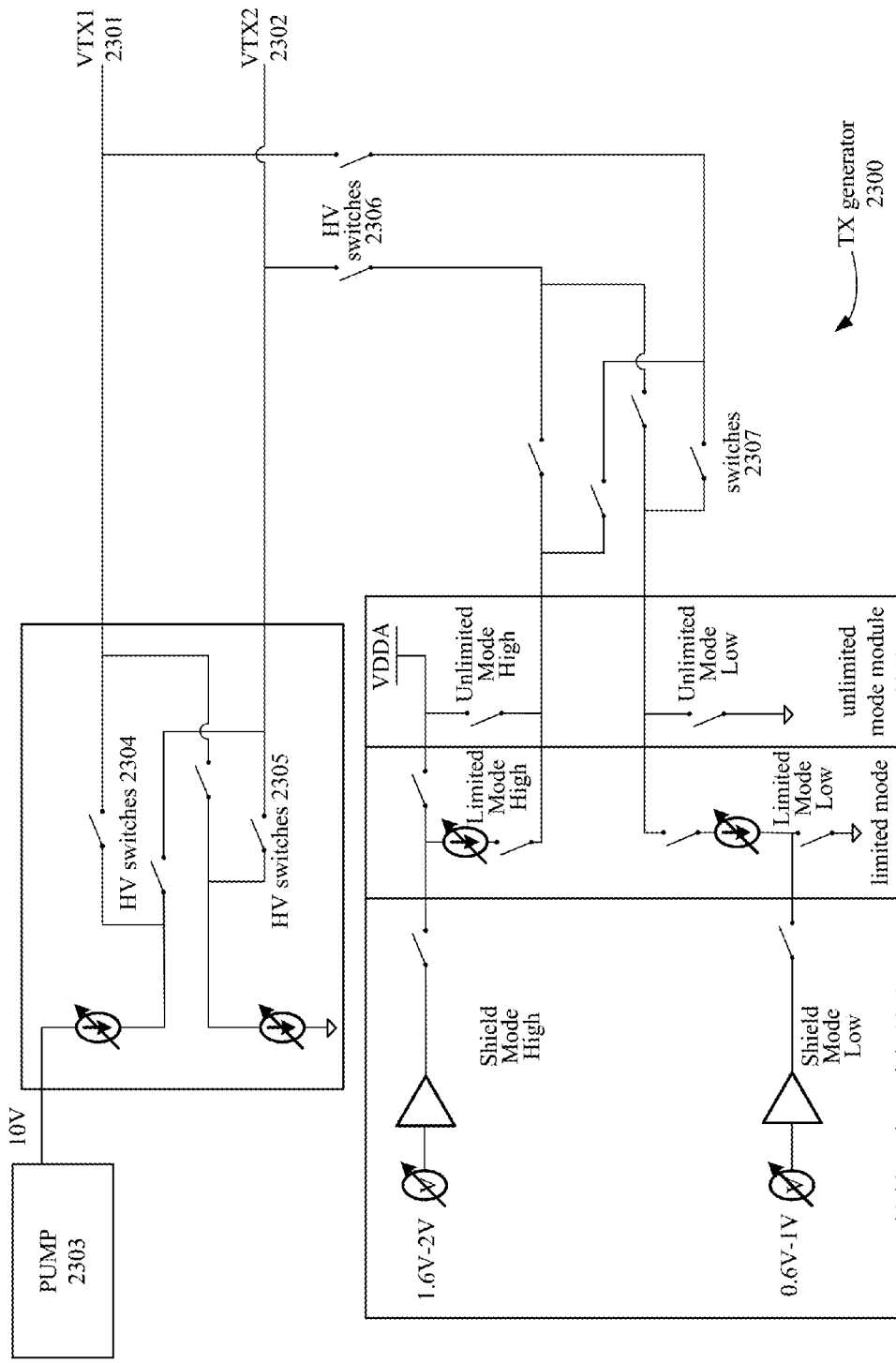
FIG. 23 illustrates an embodiment of a TX driver.

In one embodiment of a controller device, instead of having a TX generator per RX channel, a single TX generator is used that is capable of sourcing both true and complement TX signals at the same time. An embodiment of such a TX generator is illustrated in FIG. 23. Key signals provided by this block are programmable amplitude true and complement TX signals, programmable amplitude active shield drive signals, and the ability to have them present at the same time.

Figure 24:
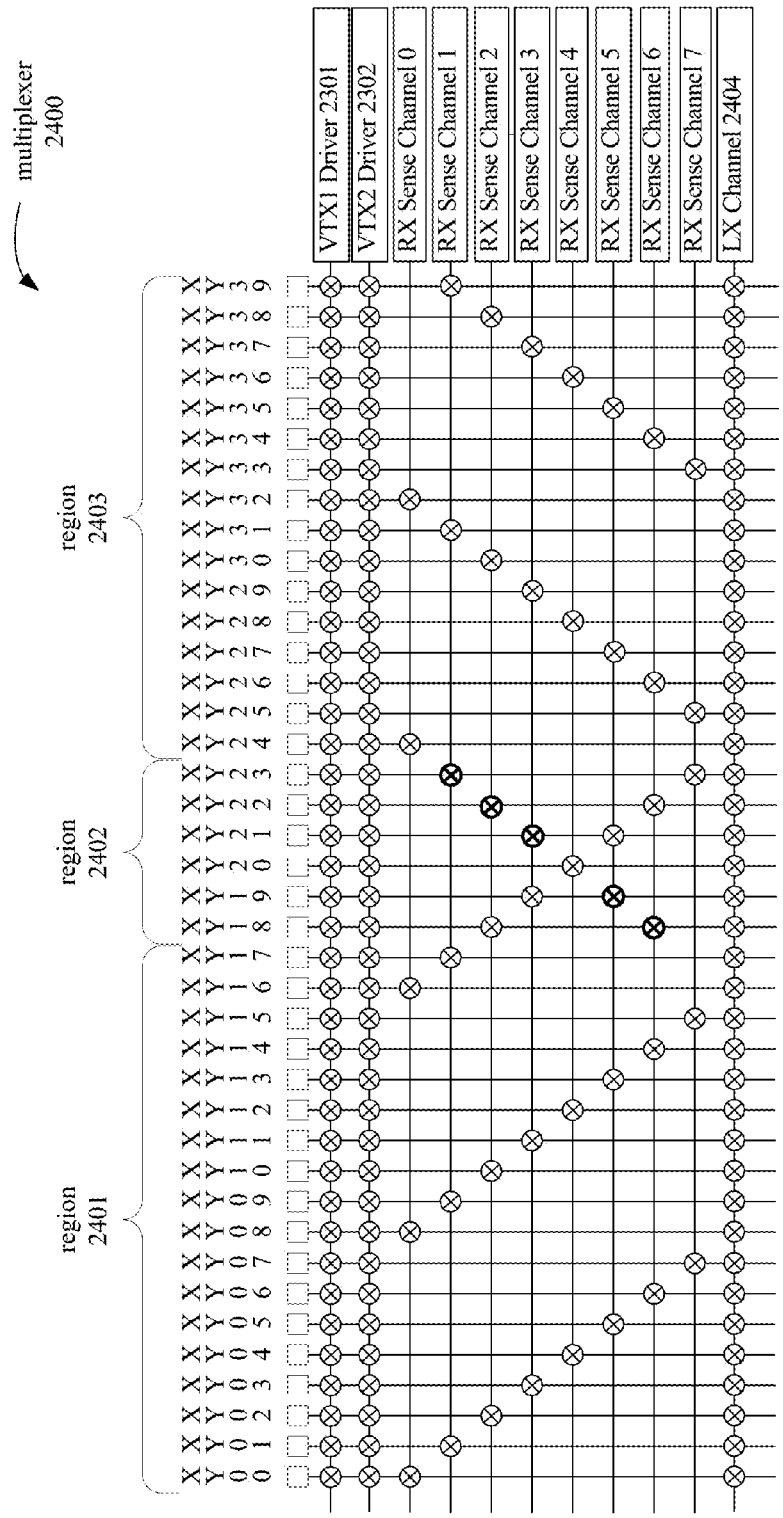
FIG. 24 illustrates an embodiment of multiplexer with two TX drivers and an LX channel.

The outputs of this TX generator block 2300 are two signals: VTX1 2301 and VTX2 2302. The previous figures (e.g., FIG. 19 and FIG. 20) that include a TX bus only show a single such bus. In one embodiment, a second TX driver bus may be included to support the use of both true and complement TX signals, simultaneously, on multiple pins, for a distributed multiplexer. In one embodiment, the additional TX driver bus may also be switchable to all XY sense pins, as illustrated in FIG. 24. In one embodiment, the first and second TX signal drivers may each be switchably connected to each pin in each of the mapping regions 2401, 2402, and 2403.

In one embodiment, the TX generator 2300 includes a pump 2303 generating 10V. The TX generator also includes two sets of high voltage switches 2304 and 2305 that are configured to switch the signals VTX1 2301 and VTX2 2302 to either the output of pump 2303 or ground, thus controlling the charge and discharge of VTX1 2301 and VTX2 2302.

In one embodiment, the TX generator 2300 may include a shield mode module 2311, a limited mode module 2312, and an unlimited mode module 2313. Each of these modules may be used to cause the TX generator 2300 to operate in a shield mode, a limited current mode, or an unlimited current mode, respectively. Switches 2307 may be used to connect either of VTX1 2301 or VTX2 2302 with the signals generated by the modules 2311, 2312, or 2313. High voltage switches 2306 may be used to protect low voltage devices.

FIG. 24 illustrates an embodiment of a multiplexer 2400 that includes a VTX1 driver 2301, a VTX2 driver 2302, and an LX sense channel input 2404, each of which is connected via a switch to each of the XY pins 00-39.

In one embodiment, a dual TX bus, such as that in FIG. 24, allows generation of multiple forms of TX signals. The first form is that of a single TX signal, where only one of the XY pins is switched to either the VTX1 or VTX2 bus.

The addition of the second TX bus (and associated VTX driver) allow other specialized modes of sensing to occur. While still considered a form of mutual capacitance sensing, what may be referred to as MC-SEB (mutual capacitance, single-electrode, balanced) requires the ability to drive approximately half the TX electrodes on one axis of the panel with a true TX signal, while the remainder are driven with a complement TX signal. In one embodiment, this is done such that the sum of the charge from the true TX pulses is approximately cancelled out by the matching complement TX pulses, and thus the coupled RX sensing channels see little if any difference in total magnitude of current from that of driving a single electrode.

In one embodiment, this MC-SEB measurement mode has the advantage of measuring primarily near-field capacitance effects. This makes it useful for resolving touches from a small conductive stylus while ignoring the shadow capacitance impact from the bulk of a nearby hand. Since this sense method measures signals coupled through all mutual capacitance intersections along a column (or row when the columns are driven), it operates similar to self-capacitance measurement methods, wherein both axes must be independently measured in order to resolve the location of a touch. This requires the ability to drive these true and complement patterns onto (alternately) both the rows and columns of the touch screen. Since TX driver capability is not present on all pins in devices implemented following the multiplexor structures shown in FIG. 10, 11, or 12, they are all prevented from measuring either traditional self-capacitance of these touchscreens, or making use of this MC-SEB sense mode.

A more powerful form of sensing also makes use of multiple TX drivers at the same time, which may be referred to as multiphase TX or Multi-TX. This makes use of a near-balanced, yet pseudo random, sequence of true and complement TX pulse trains. This pattern is measured similar to normal single-TX measurements of mutual capacitance, and then the pattern is rotated, wherein different members of the same group of driven TX electrodes are carrying true and complement TX signals. Once the pattern has been shifted through all possible offsets, the measured results are mathematically deconvoluted to provide results with a numerical reduction in noise impact (i.e., an increase in SNR). While this capability does not require the ability to reverse the sensing matrix (as does MC-SEB), it does require the ability to simultaneously drive true TX signals onto some electrodes and complement TX signals onto other electrodes, and to be able to dynamically switch which of true and complement TX signal is presented to each electrode.

An active shield drive capability is also possible with the shield mode module (elements 2311, 2312, and 2313), as illustrated in FIG. 23, in combination with the multiplexer as illustrated in FIG. 24. When sensing for self-capacitance, the measured electrodes are moved up and down relative to a local ground, and the amount of charge that each electrode can store is measured. Because these electrodes do not exist in isolation, but are in close proximity to each other, there are also mutual capacitance elements that increase the total charge in and out of each electrode, while not providing any information on their self-capacitance. To remove the parasitic mutual-capacitance, those electrodes adjacent to those being measured may be moved up and down in voltage in approximately matched phase and amplitude to the ones being measured. By keeping them at the same potential, their capacitance influence drops to near zero.

In one embodiment, when sensing column sensors for self capacitance, the row sensors may be driven with approximately the same signal to minimize their capacitive impact. Likewise, any column electrode immediately to the left or right of the last one being measured may also be driven with this shield signal. As seen in FIG. 23, the shield drive signals may be switched to the same VTX1 2301 and VTX2 2302 buses as the normal TX signals used for mutual capacitance sensing. Since this is a self-capacitance measurement, for which both row and column sensors may be measured, this active shield capability may also have the ability to assert the shield drive signal on any of the pins. Since no TX signal (true or complement) is used during self capacitance sensing, both VTX1 and VTX2 buses are available during this sensing.

In one embodiment, for environments where the parasitic or self capacitance element of the sensor dominates, such as in some of the newer in-cell sense electrode placements, a hybrid sense mode called APA-MC-BC (all-point-addressable mutual capacitance sensing with baseline compensation) may be used which makes use of a single active TX driver, but also a shield driver. This drives an active shield signal to any RX electrodes that are not coupled to RX channels, such that they all see an equivalent sensing environment.

Figure 25:
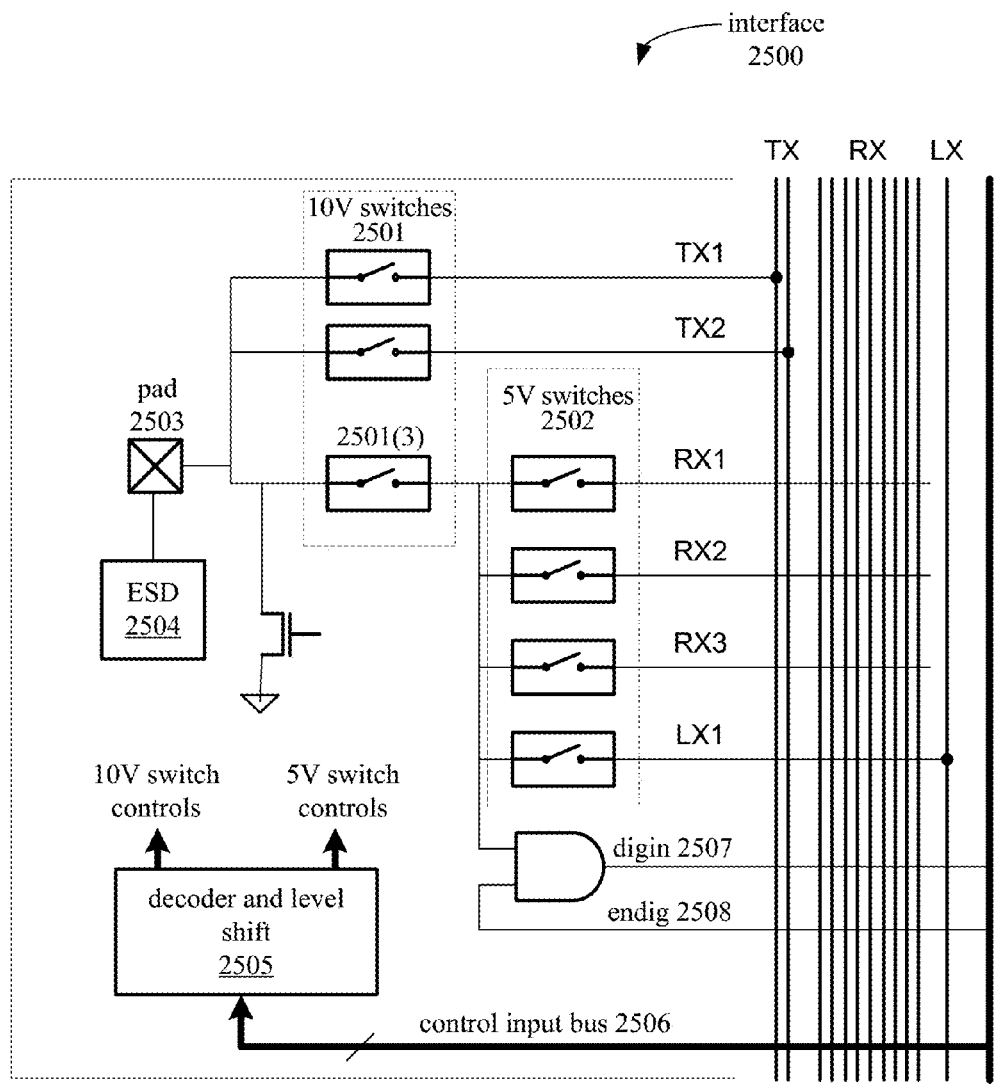
FIG. 25 illustrates an embodiment of an interface between a multiplexer bus and pads.

FIG. 25 illustrates an implementation in silicon of the switches present at each pad of the touch controller which connect that pad to the respective RX and LX sense channels and TX drivers, according to an embodiment. The interface 2500 contains switches 2501 and 2502 to connect the desired TX, RX, and LX internal signal(s) to the pad 2503 and hence to a touchscreen. Pad 2503 is connected to an ESD protection module 2504. Switches 2501 and 2502 are controlled via a decoder and level shifting module 2505, which receives signals for controlling the switches via a control input bus 2506.

The two upper high voltage (10V in this example) switches 2501 block or pass the TX1 or TX2 transmit signals when the pad 2503 is connected for transmit mode. When the transmit mode is enabled, the receive paths are blocked by having the lower switch 2501(3) in an open state. This prevents high voltage signaling from reaching the lower voltage receive circuitry. One high voltage tolerant signal (connected to switch 2501(3)) blocks the 10V signals from the lower voltage RX switches and the internal RX channel circuitry.

Figure 26:
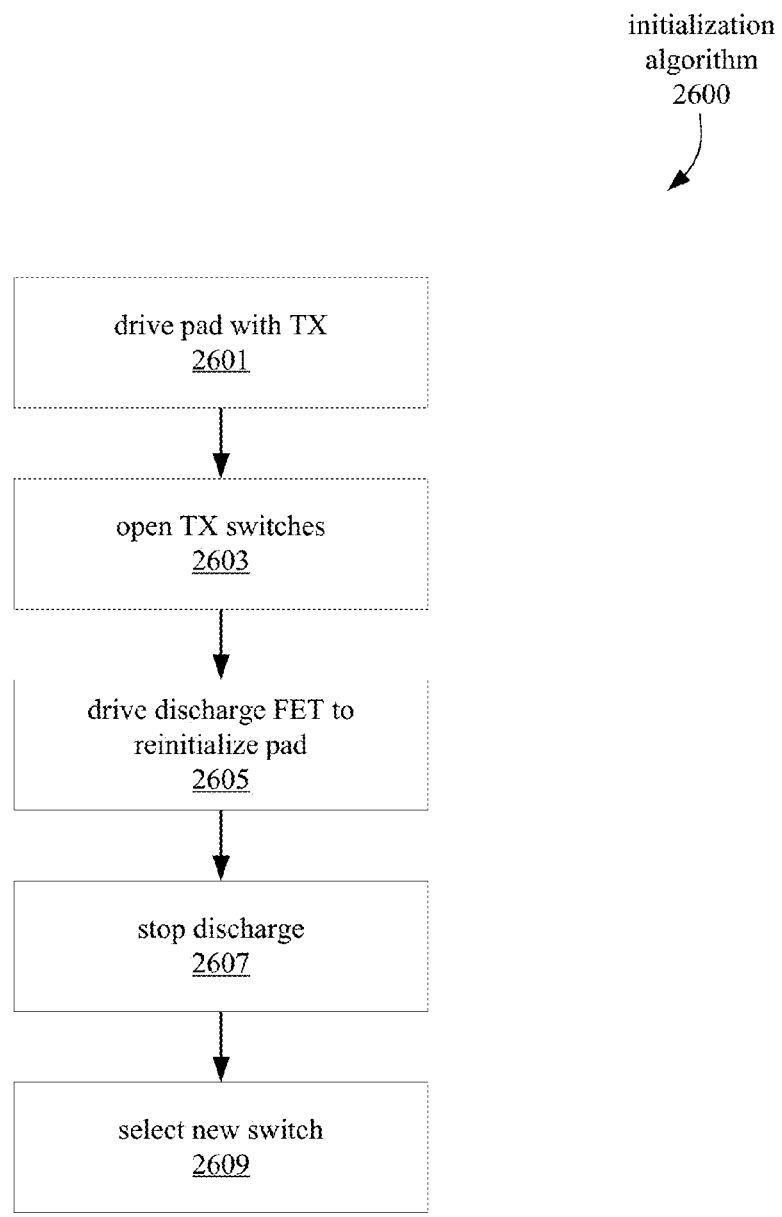
FIG. 26 is a flow diagram illustrating a process for initializing a pad upon switch reconfiguration.

Because a sense operation may end with 10V driven out on some pads, in one embodiment such as that using the 10V tolerant FET to ground connected to pad 2503 in FIG. 25, the pads may be discharged to a low voltage initial state such as ground before new paths are enabled. FIG. 26 illustrates a process for accomplishing this, according to an embodiment. The 10V tolerant discharge device is used to drive the pad low while all switches are disabled (open). After that, a TX or RX path can be safely selected and the next operation can start from a known initial state. At block 2601, the process 2600 begins by driving the pad with a TX signal. From block 2601, the process 2600 continues at block 2603, where the TX switches are opened. Subsequently, a discharge FET is driven to reinitialize the pad, at block 2605. The discharge is stopped at block 2607 and a new switch is selected at block 2609.

In one embodiment, the interface cell 2500 supports multiplexing the pad 2503 between the following (a) a number of TX channels (For example, two in FIG. 25)
(b) RX channels as needed to support configurations such as the multiplexer 2200 (of FIG. 22)
(c) an "LX" channel for connecting to a common line, in this case for listening for noise
(d) a path for passing digital signals. For example, a digital input signal 2507 may be enabled using a digital enable signal 2508.

In one embodiment, one path is selectable at a time (or all paths unselected), while in special modes multiple paths may be selected to support, for example, test modes. In one embodiment, the interface cell may contain logic operating at various voltage levels as needed; in the interface cell 2500, for example, there may be signals at 10V, 3V to 5V, and 1.8V levels.

In one embodiment, silicon efficiency, both in terms of area and design, may be achieved through the use of regular and repetitive structures. In one embodiment, each package pin of a device having a multiplexer such as multiplexer 2200 may be connected to a maximum of three RX sense channels, in addition to connections to true and complement TX drivers and a noise monitoring LX sense channel.

In one embodiment, similar advantages can be had without exceeding the native oxide breakdown of the transistors. In one such an embodiment, the high-voltage isolation switch 2501(3) separating the TX (high-voltage) and low-voltage domains may be removed. Once this is done, it may also be possible to integrate standard logic-interface or analog-interface circuits with the IO structures. For example, each XY sense pin may be configurable to be used for GPIO capability.

In one embodiment, the switch matrix function may be eliminated if each pin were directly coupled to a TX and RX sense block. In an embodiment where the analog elements for this are small enough to integrate into the IO, the depopulated switch matrix and multiplexer may be removed. The same function may then occur completely at the logical level by controlling which TX or RX circuits are enabled (rather than having most or all RX circuits used all the time). In an alternative embodiment, switches may be implemented independently of the IO.

In one embodiment, a distributed TX driver environment may be implemented, wherein instead of adding analog switches at each pin to connect to separate VTX1 and VTX2 TX or shield signal buses, a TX driver capable of driving one TX line could be implemented at each pin. In that case, only the lower power control signals need be routed to each XY pin supporting a TX function.

Relative to the shielding of the analog buses, for isolation at the highest level, each RX bus line could in one embodiment be fully shielded from neighboring RX bus lines. At higher numbers of RX bus signals, it may also be possible to add segmentation switches to the bus to allow a smaller number of bus lines to be used, without reducing the needed connectivity. Note that by segmenting a single analog bus using analog switches, the same bus can be used by more than one RX sensing channel at the same time.

In one embodiment, the above-described multiplexer embodiments may be applied to touch pads or other capacitive sensing surfaces. In one embodiment, similar structures may also be used for measuring resistive matrices.

In one embodiment, adding more channels may entail continuing the bus around the die perimeter. In an alternative embodiment, based on having sufficient RX channels to always measure the narrow-end of the panel in a single pass, the RX bus width may be cut in half (relative to a multiplexer such as multiplexer 2400 in FIG. 24). In one embodiment, this division of the bus into two parts may be used when the device is center-connected to the panel.

In one embodiment, a multiplexer circuit may support touchscreen panels where a fine scan of at least one of the X and Y axes may be performed in a single pass, such that a split routing may be used. An example of split routing is illustrated in the center layout 1320 in FIG. 13.

In one embodiment, a multiplexer circuit may move the RX channels to the center, routing a first half of such RX channels to the left and a second half to the right such that a non-overlapped sliding window structure may be used. In an alternative embodiment, the multiplexer need not support windowing on the short axis when a sufficient number of RX channels are present to allow single-pass fine scanning.

Figure 27:
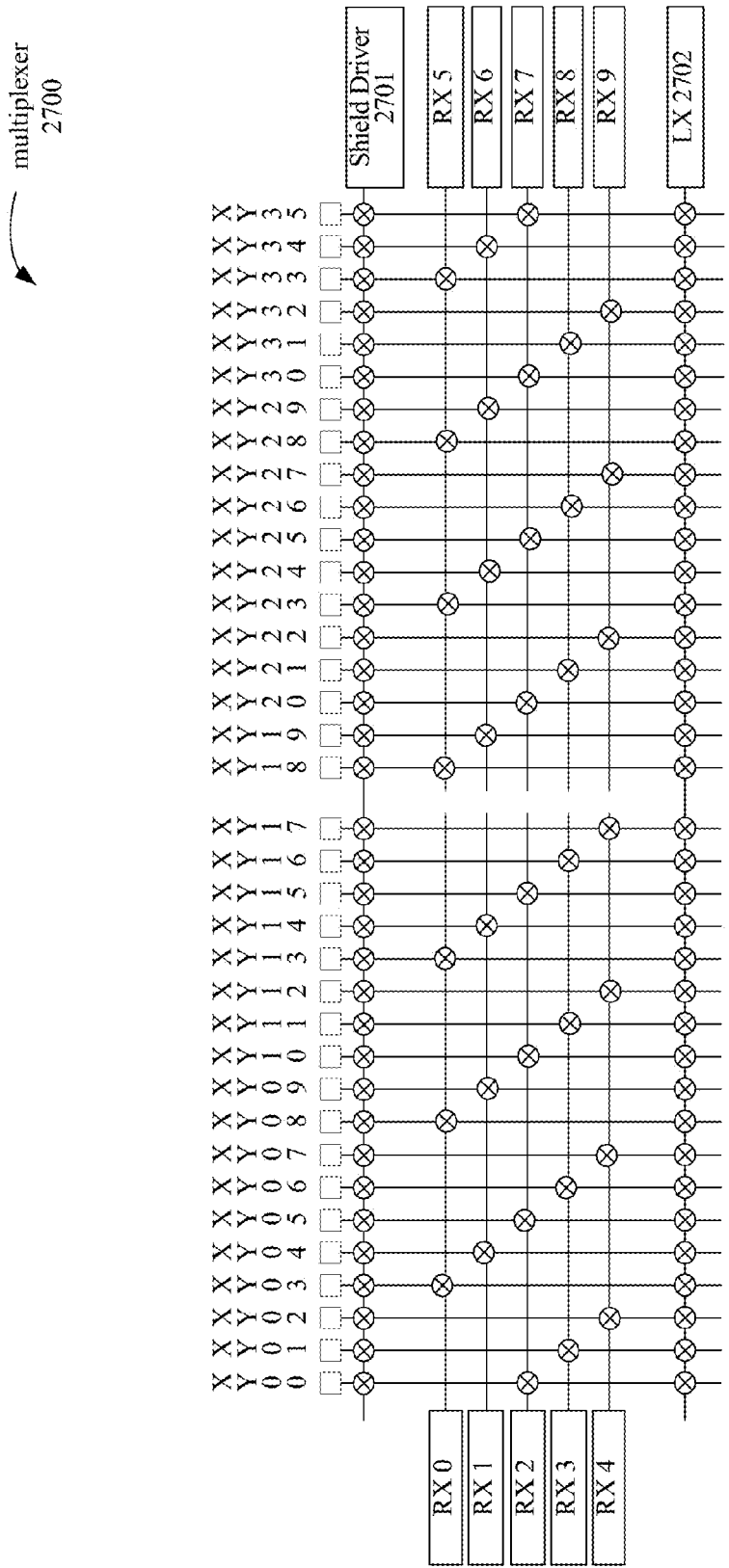
FIG. 27 illustrates an embodiment of a switch mapping for a multiplexer with a divided bus.

FIG. 27 illustrates an embodiment of a multiplexer 2700 that switchably connects the 36 total sense pins (numbered XY00-XY35) to 10 RX channels 0-9. The multiplexer 2700 also connects each of the 36 pins to shield driver 2701 and LX channel 2702.

In one embodiment, by allocating one of these channels as an LX channel 2702 (for noise synchronization) the remaining 10 channels can be split such that five are allocated to service the left half of the controller and touchscreen, and the remaining five serve the right half of the controller and touchscreen. For flexibility of monitoring, the multiplexer 2700 may provide the LX channel 2702 with access to all sides of the device, as shown in FIG. 27. In one embodiment, the LX channel 2702 may be connectable to all XY sense pins, allowing it to expand the end (left or right) of any group of 10 XY pins to be used as an 11th sense channel.

Figure 28:
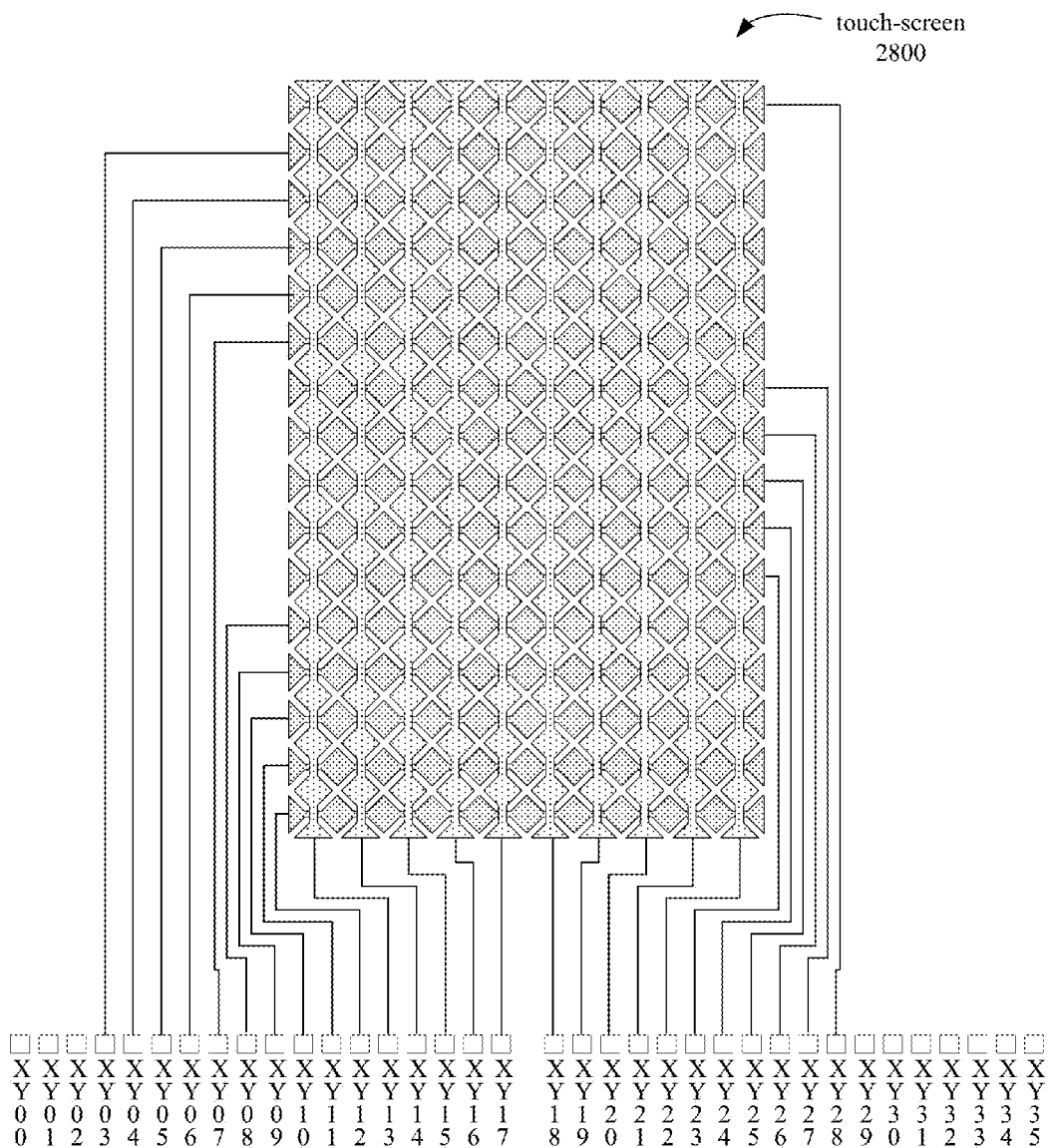
FIG. 28 illustrates touch panel connections, according to an embodiment.

In one embodiment, a touch screen controller device may include TX drivers that are built into the XY pads. In one embodiment, the shield driver is common to all of the XY IO structures, as is the connection to the LX channel. In one embodiment, these connections may be mapped to a touch panel, with the narrow part of the panel connected in the center, resulting in connections similar to those illustrated in FIG. 28. FIG. 28 illustrates a possible set of connections between the XY pins of the multiplexer 2700 and a touchscreen 2800, according to an embodiment.

In one embodiment, the columns connected at the narrow end of touchscreen 2800 in FIG. 28 can be measured in a single pass, since all of the column sensor elements can be connected to different RX channels. As shown in FIGS. 27 and 28, the RX channel mappings (from left to right) for this implementation would be 0, 1, 2, 3, 4, 5, 6, 7, 8, and 9, respectively. To measure for self or mutual capacitance along the rows, the mapped order of the RX channels (from bottom to top) in FIGS. 27 and 28 would be 4, 3, 2, 1, 0, 5, 6, 7, 8, 9, 4, 3, 2, 1, 0, and 5, respectively. This configuration may be used to map a sliding window using all available RX channels across the entire width of the panel with no RX channel existing twice within the same window.

Figure 29:
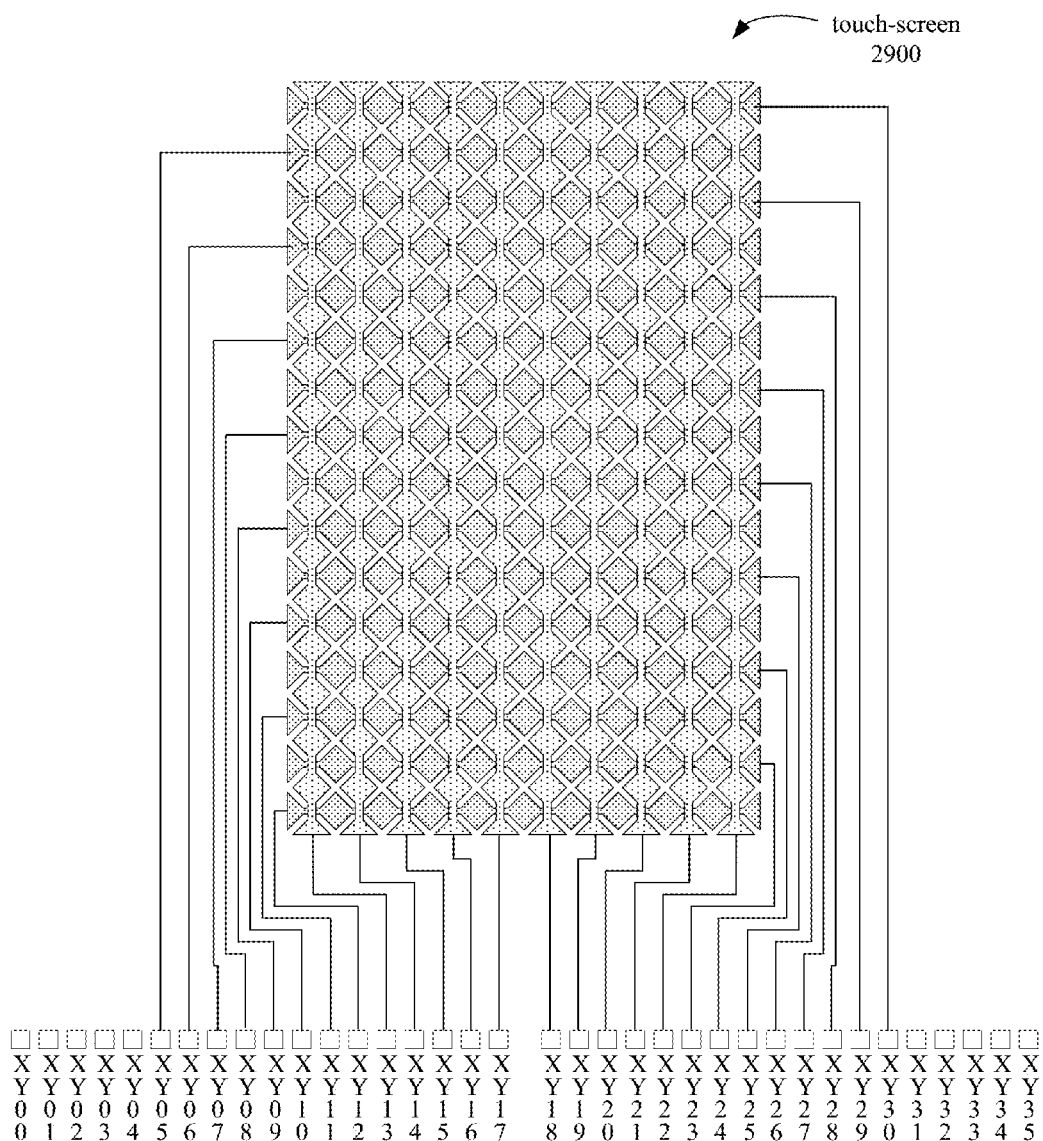
FIG. 29 illustrates touch panel connections, according to an embodiment.

FIG. 29 illustrates a set of possible connections between the XY pins of multiplexer 2700 (as illustrated in FIG. 27) and a touch screen 2900, according to an embodiment. In one embodiment, the sensor elements of touch screen 2900 that are connected to the right side XY pins may be interleaved with those that are connected to the left side XY pins, such that the order of RX channels (from bottom to top) is 4, 5, 3, 6, 2, 7, 1, 8, 0, 9, 4, 5, 3, 6, 2, 7. In one embodiment, this configuration may also support a full-width sliding window for RX operations.

Figure 30:
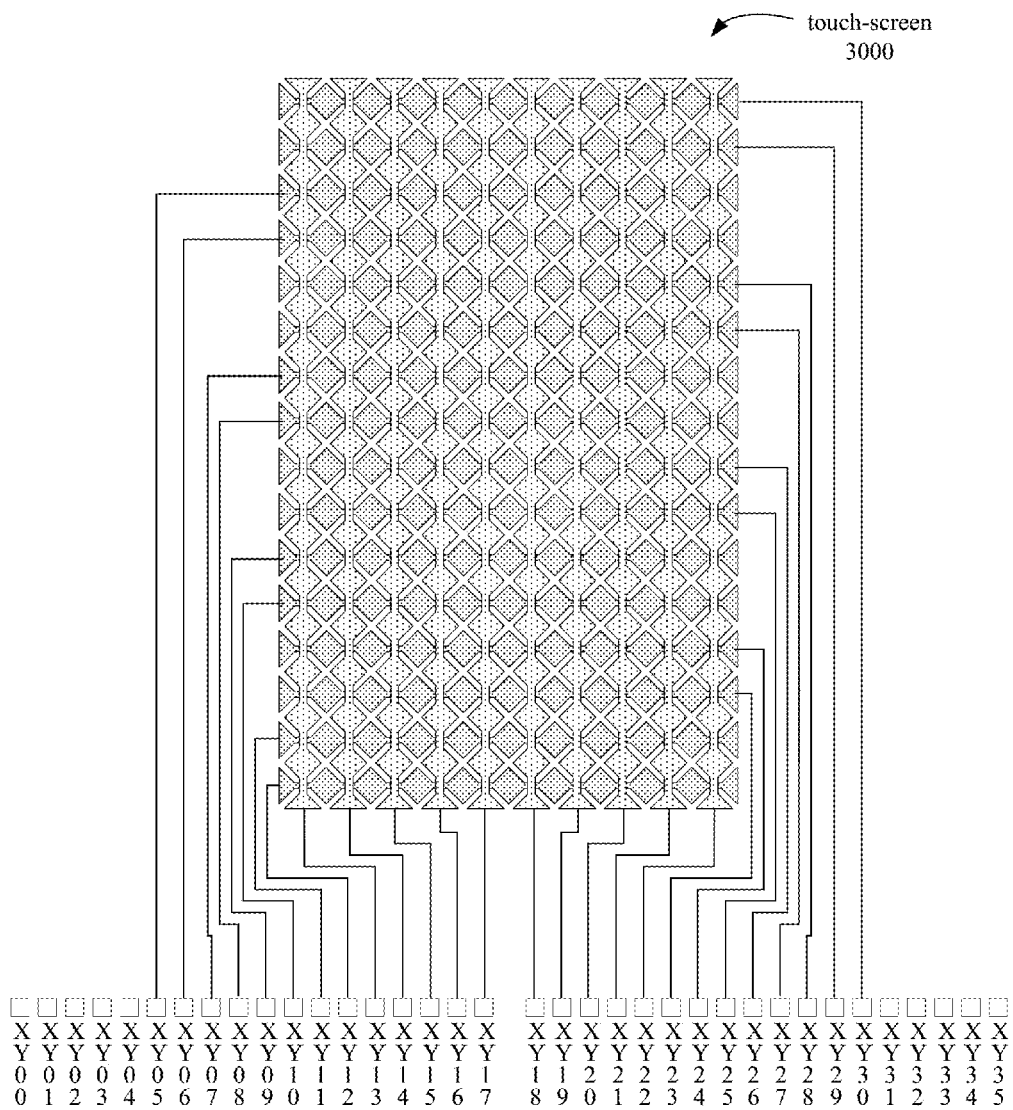
FIG. 30 illustrates touch panel connections, according to an embodiment.

FIG. 30 illustrates a set of possible connections between the XY pins of multiplexer 2700 with a touch screen 3000, according to an embodiment. As illustrated in FIG. 30, the rows of the touch screen 3000 are grouped into adjacent pairs. In one embodiment, the row mappings are shifted to be in interleaved sets of pairs, resulting in the arrangement as illustrated in FIG. 30.

In one embodiment, the layout illustrated in FIG. 30 may be used for applications such as charger noise handling, wherein all sensors on each axis are measured at the same time to allow correlated handling of charger noise.

As illustrated in FIG. 30, the RX channel utilization (from bottom to top) for this mapping is 43, 56, 21, 78, 04, 95, 32, and 67, respectively (with commas removed to show pairing). In one embodiment, this sequence may be extended to 36 sensors and 14 pairs of sensor elements, resulting in the mapping 10, 89, 43, 56, 21, 78, 04, 95, 32, 67, 10, 89, 43, and 56, respectively.

Figure 31:
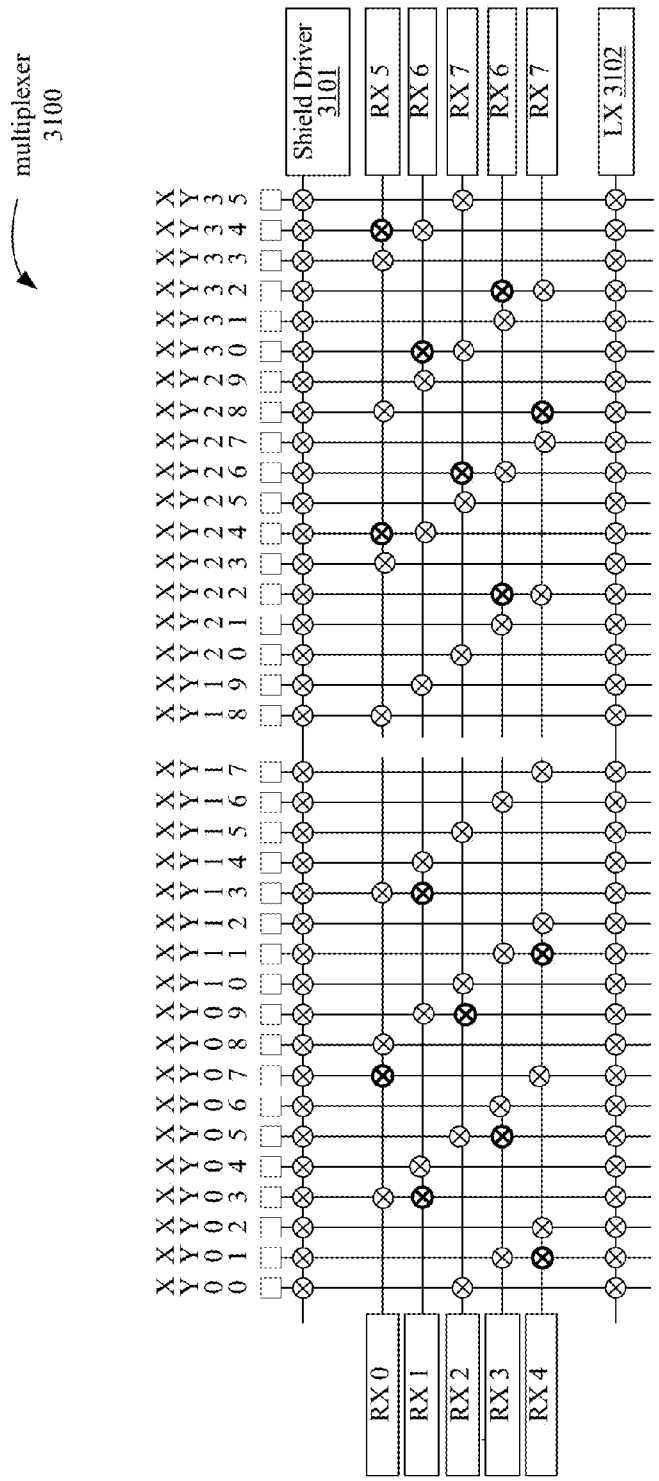
FIG. 31 illustrates an embodiment of a multiplexer having row pairing switches.

In one embodiment, additional pairing switches may then be mapped into the switch matrix of a multiplexer 3100, as illustrated in FIG. 31, which is connected to the touch screen 3000. In FIG. 31, the additional switches are shown with a bold outline. In one embodiment, the multiplexer 3100 may have a maximum of one more switch for each pin. By closing switches on each pair of adjacent pins such that they are connected to a common RX channel for a measurement, multiplexer 3100 may be able to measure a set of 20 pins using 10 RX channels in a single pass with time correlated results.

In one embodiment, a multiplexer 3100 may have a set of innermost pins (XY15-XY20) that do not have the additional pairing switches. This set of innermost pins may be used with connections to the narrow edge of touch sensors that may not need 20 row sensors; thus, other unused row connections can be used to implement the pairing.

In one embodiment, the multiplexer 3100 may be used for an implementation where the number of touch panel columns to the left or right of center is an odd number.

Figure 32:
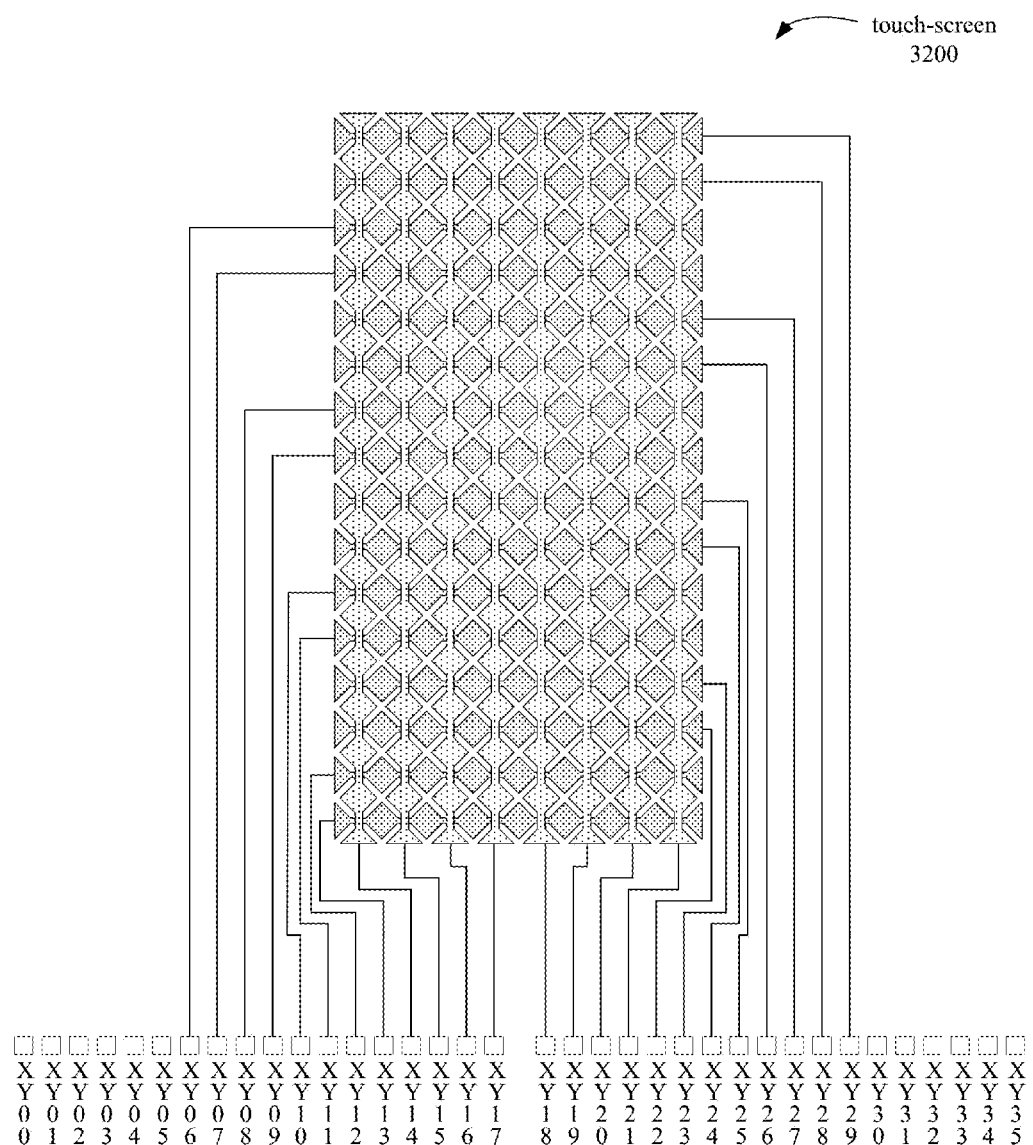
FIG. 32 illustrates touch panel connections, according to an embodiment.
Figure 33:
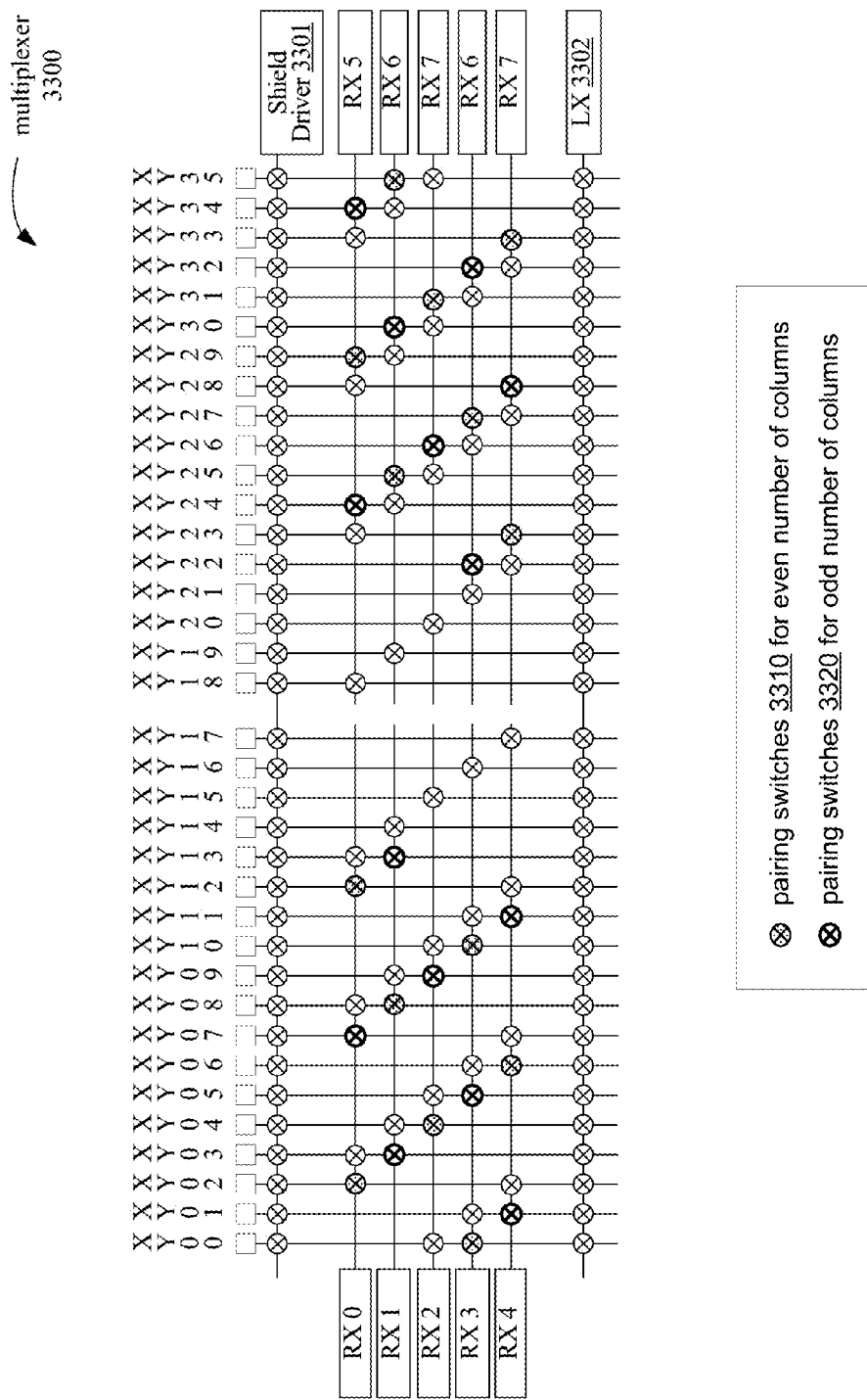
FIG. 33 illustrates an embodiment of a multiplexer having row pairing switches.

FIG. 32 illustrates an embodiment of a touchscreen 3200 that may be connected to a multiplexer 3300, illustrated in FIG. 33, through the XY pins, labeled XY00-XY35 wherein the number of columns to the left or right of center is an even number. In one embodiment, a multiplexer 3300 may support an odd or even number of center columns without adding a third RX switch to any one XY pin.

As seen in FIGS. 32 and 33, bottom to top pairings of sensor elements now have default connections to RX channels 04, 95, 32, 67, 10, 89, 43, 56, 21, 78, 04, 95, 32, 67 (with commas removed to show pairings). The switches 3310 are added to support even mappings, where the touchscreen has an even number of columns. Switches 3320 are added to support odd mappings, where the touchscreen has an odd number of columns.

According to this embodiment, a panel consisting of a left and right half, with each half consisting of either an even or odd number of columns, can have its left and right sides mapped to one of the two sequences of pairings, represented by the sets of switches 3310 and 3320.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A multiplexer circuit, comprising:
   a plurality of $P_{TOTAL}$ receive (RX) channel outputs coupled with a plurality of mutual capacitance sensing channels, wherein $P_{TOTAL}$ is a total number of the RX channel outputs;
   a plurality of switches coupled to the plurality of RX channel outputs; and
   a plurality of $Q_{TOTAL}$ pins, wherein $Q_{TOTAL}$ is a total number of the pins, each of the plurality of pins is coupled to a respective one of a plurality of sensor electrodes at a first end and a respective one of the plurality of switches at a second end, and $Q_{TOTAL}$ is greater than $P_{TOTAL}$, wherein each of a first subset and a third subset of the plurality of $Q_{TOTAL}$ pins is switchably coupled to at least a respective one of the plurality of RX channel outputs, and wherein for each possible subset of $P_{TOTAL}$ contiguous pins from the plurality of $Q_{TOTAL}$ pins, each pin in the respective possible subset is switchably coupled to a respective different RX channel output of the plurality of RX channel outputs.

2. The multiplexer circuit of claim 1, wherein each of a second subset of the plurality of $Q_{TOTAL}$ pins is switchably coupled to a respective pair of the plurality of RX channel outputs.

3. The multiplexer circuit of claim 2, wherein a variable P identifies a spatial ordinal position of a respective RX channel output of the plurality of RX channel outputs, and wherein a variable Q identifies a spatial ordinal position of a respective pin within one of the first subset, the second subset, and the third subset, and wherein a $Q^{th}$ pin within the first subset is switchably coupled to an (Q modulo $P_{TOTAL}$)$^{th}$ RX channel output.

4. The multiplexer circuit of claim 3, wherein a $Q^{th}$ pin within the second subset is switchably coupled to an (($Q_{TOTAL}$-Q) modulo $P_{TOTAL}$)$^{th}$ channel.

5. The multiplexer circuit of claim 3, wherein a $Q^{th}$ pin within the third subset is switchably coupled to both of an (Q modulo $P_{TOTAL}$)$^{th}$ channel and an (($Q_{TOTAL}$-Q) modulo $P_{TOTAL}$)$^{th}$ channel.

6. The multiplexer circuit of claim 1, further comprising:
a first transmit (TX) signal input, wherein the first TX signal input is switchably connected to each of the pins of the first, second, and third subsets of pins; and
a second TX signal input, wherein the second TX signal input is configured to carry a signal that is complementary to a signal carried by the first TX signal input.

7. The multiplexer circuit of claim 1, wherein the plurality of switches are configured to couple any of the plurality of pins with any of the plurality of RX channel outputs.

8. The multiplexer circuit of claim 1, further comprising a plurality of group scanning switches configured to connect each of the plurality of $P_{TOTAL}$ RX channel outputs with each pin of a group of contiguous pins from a plurality of groups of contiguous pins, and wherein each group of contiguous pins includes one or more pins included in another group of contiguous pins.

9. The multiplexer circuit of claim 1, wherein the first and second subsets of the plurality of pins each comprises at least two pins.

10. A multiplexer circuit, comprising:
a plurality of $P_{TOTAL}$ receive (RX) channel outputs, wherein $P_{TOTAL}$ is a total number of the RX channel outputs;
a plurality of switches coupled to the plurality of RX channel outputs; and
a plurality $Q_{TOTAL}$ of pins, wherein $Q_{TOTAL}$ is a total number of the pins, each of the plurality of pins is coupled to one of a plurality of sensor electrodes at a first end and one of the plurality of switches at a second end, the plurality of pins includes:
a first subset of pins in a first mapping region, wherein each of the first subset of pins is switchably connected to a respective one of the plurality of RX channel outputs according to a first mapping order; and
a third subset of pins in a third mapping region, wherein each of the third subset of pins is switchably connected to a respective one or more of the plurality of RX channel outputs according to the first mapping order and a second mapping order.

11. The multiplexer circuit of claim 10, wherein the plurality of pins further includes a second subset of pins in a second mapping region, wherein each of the second subset of pins is switchably connected to a respective one of the plurality of RX channel outputs according to the second mapping order, wherein the second mapping order is a reverse of the first mapping order.

12. The multiplexer circuit of claim 11, wherein a variable P identifies a spatial ordinal position of a respective RX channel output of the plurality of RX channel outputs, and wherein a variable Q identifies a spatial ordinal position of a respective pin within one of the first subset, the second subset, and the third subset, and wherein a $Q^{th}$ pin within the first subset is switchably coupled to an (Q modulo $P_{TOTAL}$)$^{th}$ RX channel output.

13. The multiplexer circuit of claim 12, wherein a $Q^{th}$ pin within the second subset is switchably coupled to an (($Q_{TOTAL}$-Q) modulo $P_{TOTAL}$)$^{th}$ channel.

14. The multiplexer circuit of claim 12, wherein a $Q^{th}$ pin within the third subset is switchably coupled to either of an (Q modulo $P_{TOTAL}$)$^{th}$ channel or an (($Q_{TOTAL}$-Q) modulo $P_{TOTAL}$)$^{th}$ channel.

15. The multiplexer circuit of claim 10, further comprising a plurality of group scanning switches configured to connect each of the plurality of $P_{TOTAL}$ channel outputs with each pin of a group of contiguous pins from a plurality of groups of contiguous pins, wherein each group of contiguous pins includes one or more pins included in another group of contiguous pins.

16. A system, comprising:
a mutual capacitance sensor, comprising:
a transmit (TX) signal generator, and
a plurality of $P_{TOTAL}$ receive (RX) channels, wherein $P_{TOTAL}$ is a total number of the RX channel outputs;
a plurality of switches coupled to the plurality of RX channel outputs and the TX signal generator; and
a plurality of $Q_{TOTAL}$ pins, wherein $Q_{TOTAL}$ is a total number of the pins, each of the plurality of pins is coupled to a respective one of a plurality of sensor electrodes at a first end and a respective one of the plurality of switches at a second end, and $Q_{TOTAL}$ is greater than $P_{TOTAL}$, wherein each of the pins is switchably coupled with the TX signal generator, wherein each of a first subset and a third subset of the plurality of $Q_{TOTAL}$ pins is switchably coupled to at least a respective one of the plurality of RX channel outputs, and wherein for each possible subset of $P_{TOTAL}$ contiguous pins from the plurality of $Q_{TOTAL}$ pins, each pin in the respective possible subset is switchably coupled to a respective different RX channel output of the plurality of RX channel outputs.

17. The system of claim 16, wherein each of a second subset of the plurality of $Q_{TOTAL}$ pins is switchably coupled to a respective pair of the plurality of RX channel outputs.

18. The system of claim 16, wherein the mutual capacitance sensor is configured to measure a mutual capacitance between a first sensor electrode of the plurality of sensor electrodes coupled with a first pin of the plurality of $Q_{TOTAL}$ pins and a second sensor electrode of the plurality of sensor electrodes coupled with a second pin of the plurality of $Q_{TOTAL}$ pins.

19. The system of claim 16, wherein the mutual capacitance sensor is configured to perform a series of window scans, wherein each window scan of the series of window scans includes a respective plurality of sequential capacitance measurements for a respective set of contiguous sensor elements.

20. The system of claim 16, wherein the mutual capacitance sensor is configured to perform a series of group scans, wherein each group scan includes a respective plurality of simultaneous capacitance measurements for a respective set of contiguous sensor elements.

\* \* \* \* \*